(12) United States Patent
Saito et al.

(10) Patent No.: US 9,494,971 B2
(45) Date of Patent: *Nov. 15, 2016

(54) ELECTRONIC APPARATUS

(71) Applicant: Sony Corporation, Tokyo (JP)

(72) Inventors: Kenji Saito, Nagano (JP); Manabu Watabe, Nagano (JP); Takashi Nakamura, Nagano (JP); Kazuto Nakagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,062

(22) Filed: Mar. 11, 2014

(65) Prior Publication Data
US 2014/0192472 A1 Jul. 10, 2014

Related U.S. Application Data

(63) Continuation of application No. 13/768,929, filed on Feb. 15, 2013, now Pat. No. 8,699,222, which is a continuation of application No. 12/835,210, filed on Jul. 13, 2010, now Pat. No. 8,391,000.

(30) Foreign Application Priority Data

Aug. 21, 2009 (JP) .................................. 2009-191768
Oct. 2, 2009 (JP) .................................. 2009-230963

(51) Int. Cl.
H05K 5/00 (2006.01)
H05K 7/00 (2006.01)
G06F 1/16 (2006.01)

(52) U.S. Cl.
CPC ............. *G06F 1/1613* (2013.01); *G06F 1/166* (2013.01); *G06F 1/1616* (2013.01); *G06F 1/1656* (2013.01); *G06F 1/1671* (2013.01); *H01R 2201/06* (2013.01)

(58) Field of Classification Search
CPC .. G06F 1/1613; G06F 1/1616; G06F 1/1656; G06F 1/166; G06F 1/1671

USPC .............. 361/679.01, 679.02, 679.26, 679.3, 361/679.55, 679.56, 679.57, 679.58, 679.59
See application file for complete search history.

(56) References Cited

U.S. PATENT DOCUMENTS 5,251,102 A 10/1993 Kimble
5,297,003 A 3/1994 Nomura et al.
(Continued)

FOREIGN PATENT DOCUMENTS

JP 5-119855 5/1993
JP 5-119885 5/1993
(Continued)

OTHER PUBLICATIONS

Office Action issued Aug. 5, 2014 in Japanese Patent Application No. 2009-230963 (with English translation).
(Continued)

*Primary Examiner* — Anthony Haughton
(74) *Attorney, Agent, or Firm* — Oblon, McClelland, Maier & Neustadt, L.L.P

(57) ABSTRACT

An electronic apparatus includes: a display portion including a display screen; a main body portion including upper and bottom surfaces; and a coupling portion to couple the display portion with the main body portion such that the display portion becomes rotatable between a first state where the display screen faces the upper surface and a second state where the display screen forms a predetermined angle with respect to the upper surface, the main body portion including a pair of side surfaces, and a first connector connectable with a first external connector and includes a lower surface exposed from the bottom surface, the display portion including a first leg portion that protrudes to be positioned lower than the bottom surface in the second state and comes into contact with a surface on which the main body portion is placed to form a predetermined tilt with respect to the surface.

11 Claims, 31 Drawing Sheets

(56) References Cited

U.S. PATENT DOCUMENTS

| | | | |
|---|---|---|---|
| 5,469,327 A | 11/1995 | Cheng | |
| 5,918,957 A | 7/1999 | Bovio et al. | |
| 5,964,599 A * | 10/1999 | Choi | 439/135 |
| 6,002,581 A | 12/1999 | Lindsey | |
| 6,053,589 A | 4/2000 | Ling | |
| 6,473,296 B2 * | 10/2002 | Amemiya | G06F 1/1616 292/148 |
| 6,961,240 B2 | 11/2005 | Janicek | |
| 7,075,781 B2 | 7/2006 | Peng | |
| 7,079,383 B2 | 7/2006 | Homer | |
| 7,566,043 B2 | 7/2009 | Chen | |
| 7,643,277 B2 * | 1/2010 | Tang | 361/679.15 |
| 7,715,190 B2 | 5/2010 | Tang | |
| 7,717,389 B2 | 5/2010 | Berman | |
| 7,746,636 B2 * | 6/2010 | Tang | 361/679.55 |
| 7,813,122 B2 * | 10/2010 | Wang | 361/679.55 |
| 7,821,786 B2 * | 10/2010 | Hadad | G06F 1/1616 248/616 |
| 7,855,883 B2 * | 12/2010 | Tang | 361/679.55 |
| 7,926,781 B2 * | 4/2011 | Wang | 248/685 |
| 7,990,703 B2 * | 8/2011 | Tang | 361/679.59 |
| 2005/0117286 A1 | 6/2005 | Karashima et al. | |
| 2008/0101000 A1 | 5/2008 | Asawa et al. | |
| 2009/0268396 A1 * | 10/2009 | Tang | G06F 1/166 361/679.55 |
| 2009/0303680 A1 | 12/2009 | Mihara et al. | |

FOREIGN PATENT DOCUMENTS

| | | |
|---|---|---|
| JP | 9-244778 | 9/1997 |
| JP | 11-272362 | 10/1999 |
| JP | 2001-67166 | 3/2001 |
| JP | 2001-273053 | 10/2001 |
| JP | 2005-128805 | 5/2005 |
| JP | 3143699 | 7/2008 |
| WO | WO 2006/008815 A1 | 1/2006 |

OTHER PUBLICATIONS

Trial Decision mailed on Jun. 23, 2015 for Japanese Application No. 2009-230963 (with English translation).

Office Action issued Mar. 30, 2016 in Chinese Patent Application No. 201310435861.8 (with English translation).

Office Action issued Apr. 1, 2014 in Japanese Patent Application No. 2009-230963 (with English language translation).

"ITmedia PC User High end slim note whose security is reinforced", Finger Mark Function—Japan IBM ThinkPad t42p, http://ww.itmedia.co.jp/pcupdate/articles/0412/03/news060.html, Dec. 3, 2004, pp. 1-5 with cover page.

"Pocket vision blog eee PC picture collection 6-side", Pocket Vision Inc., http://pocketvisionblog.com/?no=21, May 21, 2008, pp. 1-2 with cover page.

* cited by examiner

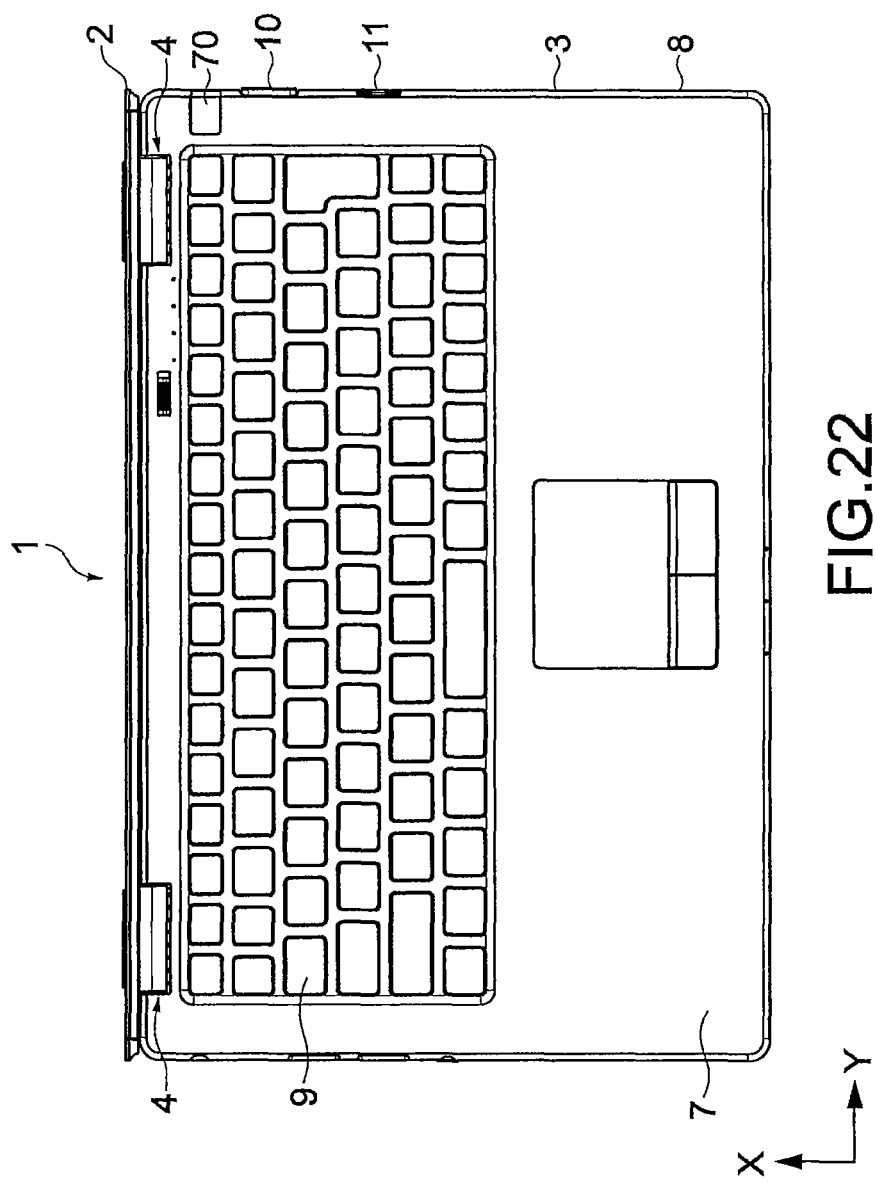

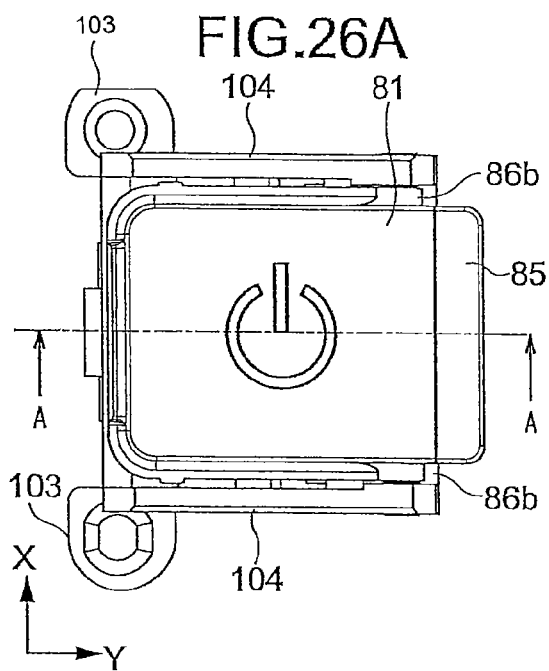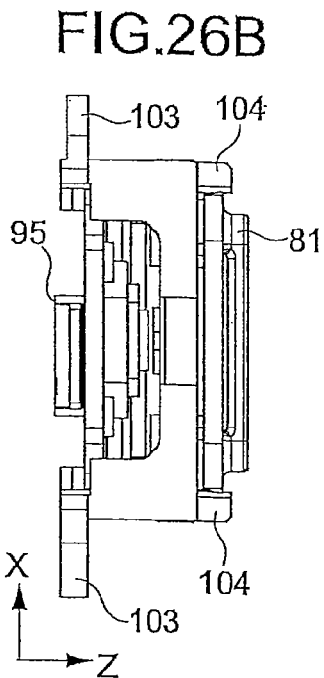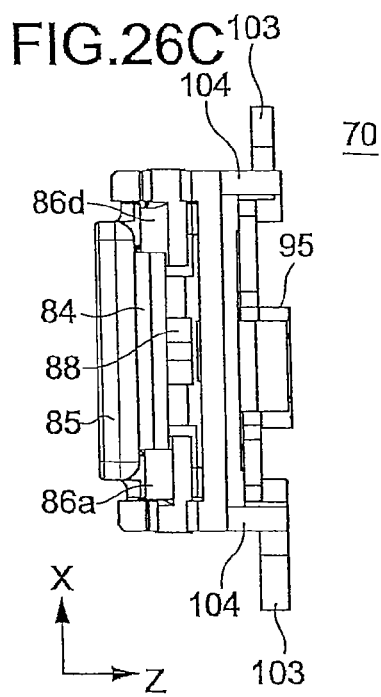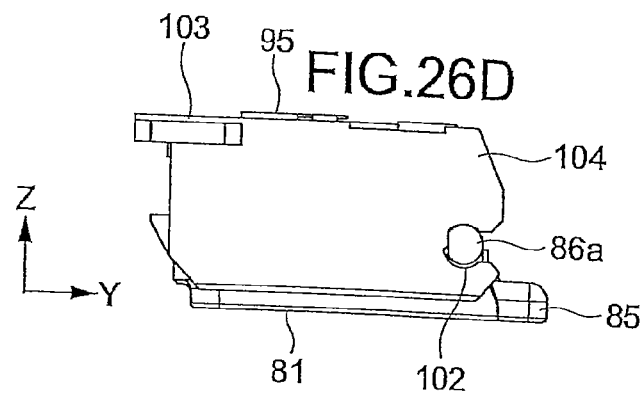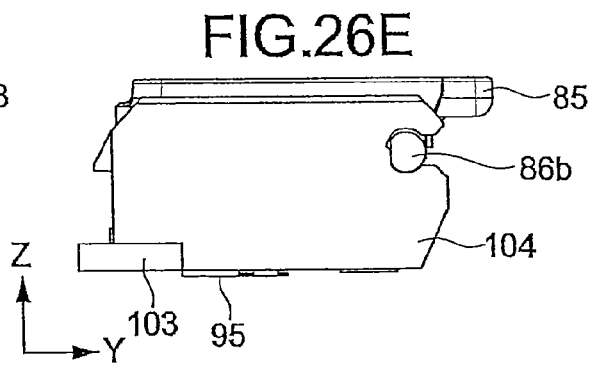

81

ELECTRONIC APPARATUS

CROSS REFERENCE TO RELATED APPLICATIONS

This application is a continuation application of, and claims the benefit of priority under 35 U.S.C. §120 from, U.S. application Ser. No. 13/768,929, filed Feb. 15, 2013, which is a continuation of U.S. Pat. No. 8,391,000, issued Mar. 5, 2013, which claims the benefit of priority under 35 U.S.C. §119 from Japanese Patent Applications Nos. 2009 191768, filed Aug. 21, 2009 and 2009 230963, filed Oct. 2, 2009. The entire contents of each of the above applications are incorporated herein by reference.

BACKGROUND OF THE INVENTION

1. Field of the Invention

The present invention relates to an electronic apparatus such as a foldaway laptop personal computer.

2. Description of the Related Art

From the past, an electronic apparatus such as a foldaway laptop personal computer (hereinafter, referred to as PC) is equipped with a main body portion including a keyboard and a display portion that is rotatably coupled with the main body portion. A connector to which a connector portion provided at one end of an information communication cable is connected is provided on a side surface of the main body portion, and a leg member for placing the electronic apparatus on a desk or the like while tilting the keyboard is provided on a bottom surface of the main body portion of the electronic apparatus while being rotatable with respect to the main body portion (see, for example, Japanese Patent Application Laid open No. Hei 5 119885 (paragraphs [0006] and [0007], FIGS. 2 and 3)).

SUMMARY OF THE INVENTION

However, in recent years, thinning of such a laptop PC is progressing. Therefore, if a connector portion of an information communication cable having a predetermined thickness is connected to a connector of the laptop PC, a position of a bottom surface of the connector portion may become lower than that of a bottom surface of the main body portion of the laptop PC depending on the thickness of the connector portion. Since the leg member described above has a structure that does not take the thickness of the connector portion into account, there is a problem that it is difficult to secure a stability of a placement condition of the laptop PC when the laptop PC is placed on a desk or the like.

In view of the circumstances as described above, there is a need for an electronic apparatus with a reduced thickness that is capable of securing a stable placement condition in a state where an external connector is connected.

According to an embodiment of the present invention, there is provided an electronic apparatus including a display portion, a main body portion, and a coupling portion. The display portion includes a display screen. The main body portion includes an upper surface and a bottom surface facing each other. The coupling portion couples the display portion with the main body portion such that the display portion becomes rotatable between a first state where the display screen faces the upper surface and a second state where the display screen forms a predetermined angle with respect to the upper surface. The main body portion includes a pair of side surfaces that are orthogonal to the bottom surface and face each other, and a first connector that is provided on one of the pair of side surfaces while being connectable with a first external connector and includes a lower surface exposed from the bottom surface. The display portion includes a first leg portion that protrudes to be positioned lower than the bottom surface in the second state and comes into contact with a surface on which the main body portion is placed to form a predetermined tilt of the bottom surface with respect to the surface.

In the embodiment of the present invention, the main body portion includes the first connector on one of the pair of side surfaces, and the lower surface of the first connector is exposed from the bottom surface of the main body portion. By providing such a first connector, a thickness of the main body portion can be reduced, with the result that the electronic apparatus can be made thinner. Moreover, the display portion includes the first leg portion that protrudes to be positioned lower than the bottom surface of the main body portion in the second state where the display screen forms a predetermined angle with respect to the upper surface of the main body portion and comes into contact with the surface on which the main body portion is placed to form a predetermined tilt of the bottom surface of the main body portion with respect to the surface. Therefore, a gap can be formed below the bottom surface of the main body portion at a time the main body portion is placed on the surface, and an interference between the first connector and the surface on which the main body portion is placed can be prevented from occurring while the first external connector is connected to the first connector. As a result, a stable placement condition of the electronic apparatus can be secured.

A position of the lower surface of the first connector and a position of the bottom surface in a thickness direction orthogonal to the bottom surface may substantially be the same.

With this structure, since the lower surface of the first connector and the bottom surface of the main body portion are positioned on the same plane, the main body portion can be made thinner than in a case where the position of the bottom surface of the main body portion is lower than that of the lower surface of the first connector.

The main body portion may include a second leg portion rotatably provided on the bottom surface thereof, and the second leg portion may be rotatable between a first rotational position at which the second leg portion is apart from the surface in the second state and a second rotational position at which the second leg portion comes into contact with the surface in the second state and supports the main body portion in a state where the first leg portion floats from the surface.

With this structure, by causing the second leg portion to rotate so that it protrudes from the bottom surface of the main body portion and placing it on the surface on which the main body portion is placed, the tilt of the bottom surface of the main body portion with respect to the surface can be made larger than the predetermined tilt. Therefore, also when a thicker first external connector is connected to the first connector, an interference between the first external connector and the surface can be prevented from occurring.

The main body portion may have a dented portion that is provided in the vicinity of the coupling portion and capable of accommodating the second leg portion at the first rotational position formed on the bottom surface thereof.

With this structure, the second leg portion can be accommodated in the dented portion.

The first connector may be a connector for supplying a video signal to an external display.

With this structure, a connector for supplying a video signal to the external display can be connected to the first connector.

The main body portion may further include a second connector provided more on a front side than the first connector, and a size of the second connector in the thickness direction of the main body portion may be smaller than that of the first connector.

With this structure, since a distance between the bottom surface of the main body portion and the surface on which the main body portion is placed increases as a distance from the front side of the main body portion increases, an interference between the first external connector and the surface can be positively prevented from occurring.

According to another embodiment of the present invention, there is provided an electronic apparatus including a display portion, a main body portion, and a coupling portion. The display portion includes a display screen. The main body portion includes an upper surface and a bottom surface facing each other. The coupling portion couples the display portion with the main body portion such that the display portion becomes rotatable between a first state where the display screen faces the upper surface and a second state where the display screen forms a predetermined angle with respect to the upper surface. The main body portion includes a second leg portion rotatably provided on the bottom surface of the main body portion, a pair of side surfaces that are orthogonal to the bottom surface and face each other, and a first connector that is provided on one of the pair of side surfaces while being connectable with a first external connector and includes a lower surface exposed from the bottom surface. The second leg portion is rotatable between a first rotational position at which the second leg portion is apart from a surface on which the main body portion is placed in the second state and a second rotational position at which the second leg portion comes into contact with the surface in the second state and supports the main body portion in a state where the display portion floats from the surface.

In the embodiment of the present invention, the main body portion includes the first connector on one of the pair of side surfaces, and the lower surface of the first connector is exposed from the bottom surface of the main body portion. By providing such a first connector, a thickness of the main body portion can be reduced, with the result that the electronic apparatus can be made thinner. Moreover, the display portion can be caused to float from the surface at a time the second leg portion is placed on the surface by being rotated to the second rotational position so that it protrudes from the bottom surface of the main body portion. Thus, a gap can be formed below the bottom surface of the main body portion, and an interference between the first connector and the surface can be prevented from occurring while the first external connector is connected to the first connector. As a result, a stable placement condition of the electronic apparatus can be secured.

A position of the lower surface of the first connector and a position of the bottom surface in a thickness direction orthogonal to the bottom surface may substantially be the same.

With this structure, the lower surface of the first connector and the bottom surface of the main body portion can be positioned on the same plane, and the main body portion can therefore be made thinner.

The main body portion may have a dented portion that is provided in the vicinity of the coupling portion and capable of accommodating the second leg portion at the first rotational position formed on the bottom surface thereof.

With this structure, the second leg portion can be accommodated in the dented portion.

The display portion may include a first leg portion that protrudes to be positioned lower than the bottom surface in the second state and comes into contact with the surface to form a predetermined tilt, the predetermined tilt being smaller than a tilt formed by the second leg portion.

With this structure, it is possible to accommodate the second leg portion in the dented portion in the second state where the display screen forms a predetermined angle with respect to the upper surface of the main body portion and form a gap below the bottom surface of the main body portion at a time the main body portion is placed on the surface, and prevent an interference between the second connector and the surface from occurring while the second external connector is connected to the second connector.

The first connector may be a connector for supplying a video signal to an external display.

With this structure, a connector for supplying a video signal to the external display can be connected to the first connector.

The main body portion may further include a second connector provided more on a front side than the first connector, and a size of the second connector in the thickness direction of the main body portion may be smaller than that of the first connector.

With this structure, a distance between the bottom surface of the main body portion and the surface on which the main body portion is placed becomes smaller as a distance from the front side of the main body portion decreases. In other words, a distance between the bottom surface of the main body portion and the surface on which the main body portion is placed increases as the distance from the front side of the main body portion increases. As a result, an interference between the first external connector and the surface can be positively prevented from occurring.

According to another embodiment of the present invention, there is provided an electronic apparatus including a display portion, a main body portion, and a coupling portion. The display portion includes a display screen. The main body portion includes an upper surface and a bottom surface facing each other. The coupling portion couples the display portion with the main body portion such that the display portion becomes rotatable between a first state where the display screen faces the upper surface and a second state where the display screen forms a predetermined angle with respect to the upper surface. The main body portion includes a pair of side surfaces that are orthogonal to the bottom surface and face each other, a second connector that is provided on one of the pair of side surfaces while being connectable with a second external connector and includes a terminal portion provided on the side surface as one of the pair of side surfaces in an exposable state to be connected to the second external connector, and a cover that is rotatable with the bottom surface side as a fulcrum so that the terminal portion of the second connector is opened and closed. The display portion includes a first leg portion that protrudes to be positioned lower than the bottom surface in the second state and comes into contact with a surface on which the main body portion is placed to form a predetermined tilt of the bottom surface with respect to the surface so that an interference between the cover and the surface is avoided at a time the cover is opened.

In the embodiment of the present invention, the main body portion includes the second connector including the terminal portion provided on one of the pair of side surfaces in an exposable state and the cover that is rotatable with the bottom surface side as a fulcrum so that the terminal portion of the second connector is opened and closed. Thus, even when the main body portion is thinner than the second external connector, that is, even when the second external connector is thicker than the main body portion, the cover can be opened and the second external connector can be connected to the second connector. Moreover, by closing the cover at a time the second connector is unused, the terminal portion of the second connector can be protected. Further, the display portion includes the first leg portion that protrudes to be positioned lower than the bottom surface of the main body portion in the second state and comes into contact with the surface on which the main body portion is placed to form a predetermined tilt of the bottom surface of the main body portion with respect to the surface. Therefore, it is possible to form a gap below the bottom surface of the main body portion at a time the main body portion is placed on the surface and prevent an interference between the opened cover and the surface from occurring while the second external connector is connected to the second connector. As a result, a stable placement condition of the electronic apparatus can be secured.

The cover may have an L shaped cross section for covering a lower surface of the second connector and the terminal portion of the second connector.

With this structure, by causing the cover to rotate with the bottom surface as a fulcrum and exposing the connection portion of the second connector, the second external connector thicker than the main body portion can be connected to the connection portion.

A position of a lower surface of the cover and a position of the bottom surface in a thickness direction orthogonal to the bottom surface may substantially be the same.

With this structure, the lower surface of the cover and the bottom surface of the main body portion can be positioned on the same plane, and the main body portion can therefore be made thinner.

The main body portion may include a second leg portion rotatably provided on the bottom surface of the main body portion, and the second leg portion may be rotatable between a first rotational position at which the second leg portion is apart from the surface in the second state and a second rotational position at which the second leg portion comes into contact with the surface in the second state and supports the main body portion in a state where the first leg portion floats from the surface.

With this structure, by placing the second leg portion on the surface on which the main body portion is placed by rotating it so that it protrudes from the bottom surface of the main body portion, the tilt of the bottom surface of the main body portion with respect to the surface can be made larger than the predetermined tilt. As a result, even when the first external connector thicker than the second external connector is connected to the first connector, an interference between the first external connector and the surface can be prevented from occurring.

Furthermore, the electronic apparatus according to the embodiment of the present invention further includes a button portion body that is provided so as to be exposed from the upper surface of the main body portion, enables a user to perform a press operation, is formed of a light guide material having light diffuseness, and includes a portion protruding from one of the pair of side surfaces as a light guide body exposure portion, and a light source that irradiates light onto the button portion body.

With this structure, even when the display portion is closed and folded with respect to the main body portion, the user can visually recognize a light emission state of the light guide body exposure portion protruding from the side surface of the electronic apparatus. As a result, an electronic apparatus in which the button portion having the function of displaying a state of the electronic apparatus is provided so as to be exposed from the upper surface of the main body portion can be realized, and the entire apparatus can therefore be made thinner.

The button portion body may be operated for turning on the power of the electronic apparatus.

The button portion body may be integrally formed with a leaf spring portion for generating a repulsion when pressed by the user. Thus, it becomes unnecessary to additionally incorporate an elastic component in place of the leaf spring portion, with the result that the number of components, size, and cost can be reduced.

The button portion body may further include a diffuse reflection portion for causing a diffusion by diffusely reflecting light in guiding light from the light source. With this structure, by the diffusion caused by the diffuse reflection of light by the diffuse reflection portion, light can be guided to the entire light guide body exposure portion more uniformly to uniformly light up the entire light guide body exposure portion.

The display portion and the main body portion may each have a shape that is bulged so that an apex is formed substantially at an intermediate height on side surfaces thereof and a U shaped groove is formed in adjacent side surface areas at a time the display portion is closed with respect to the main body portion, and the light guide body exposure portion may be exposed from the U shaped groove. With this structure, light of the light guide body exposure portion can be diffusely reflected inside the U shaped groove, and the light emission state can be made more conspicuous.

According to the embodiments of the present invention, a stable placement condition of an electronic apparatus with a reduced thickness can be secured while an external connector is connected thereto.

These and other objects, features and advantages of the present invention will become more apparent in light of the following detailed description of best mode embodiments thereof, as illustrated in the accompanying drawings.

BRIEF DESCRIPTION OF DRAWINGS

FIG. 22 is a plan view of the electronic apparatus shown in FIG. 1;

FIGS. 26A-26E show four orthogonal views of the power supply button portion shown in FIG. 24;

DESCRIPTION OF PREFERRED EMBODIMENTS

Hereinafter, an embodiment of the present invention will be described with reference to the drawings.

(Structure of Electronic Apparatus)

Figure 1:
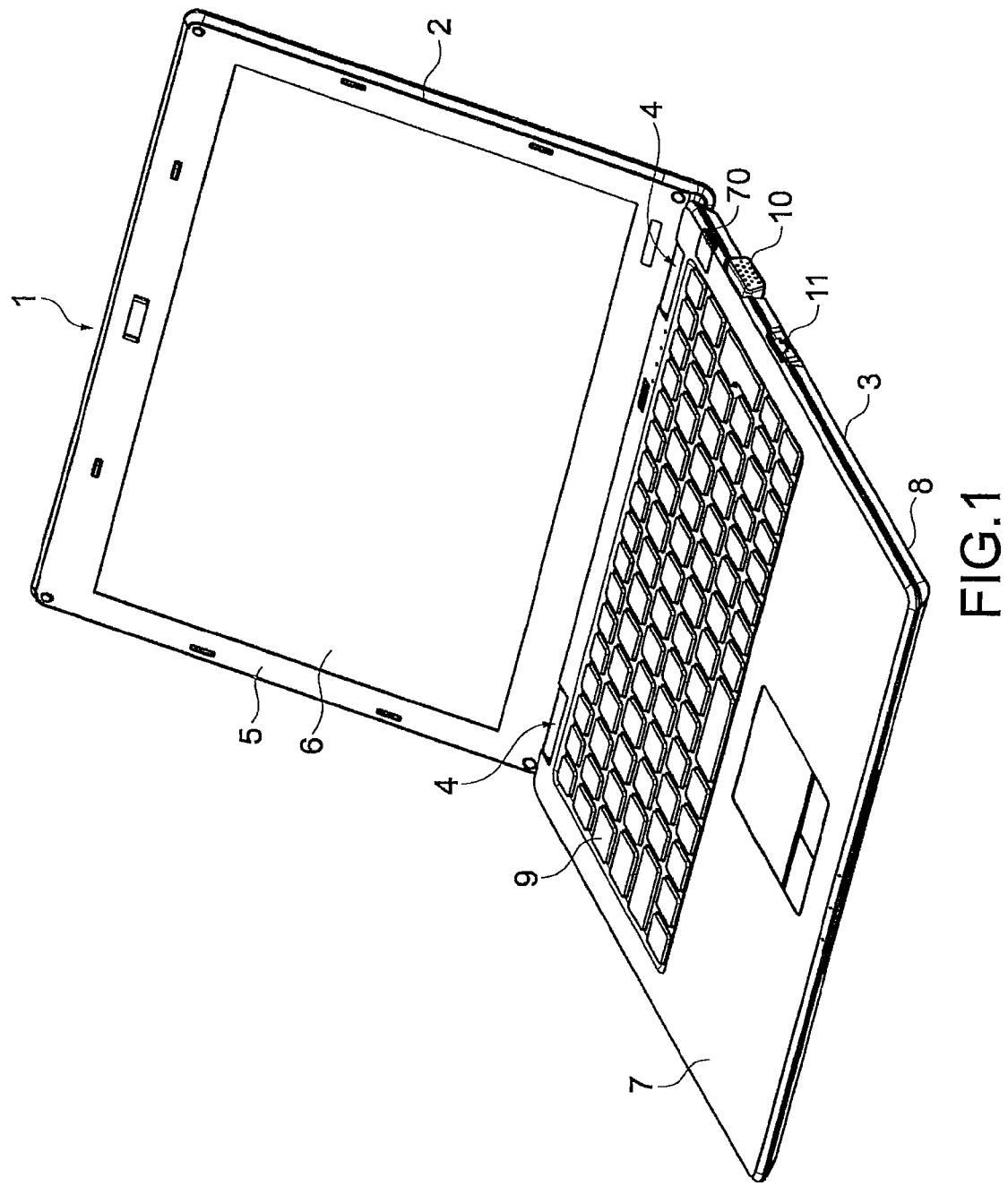
FIG. 1 is a perspective view showing a state where an electronic apparatus according to an embodiment of the present invention is opened.
Figure 2:
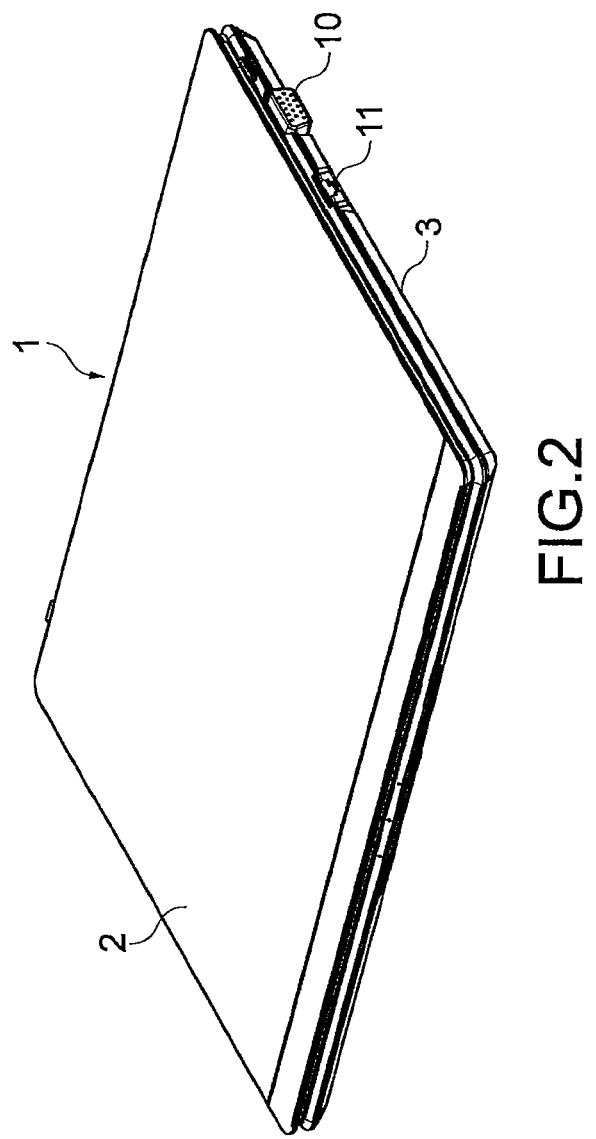
FIG. 2 is a perspective view showing a state where the electronic apparatus shown in FIG. 1 is closed.

FIG. 1 is a perspective view showing a state where an electronic apparatus 1 according to an embodiment of the present invention is opened, and FIG. 2 is a perspective view showing a state where the electronic apparatus 1 shown in FIG. 1 is closed (first state).

The electronic apparatus 1 includes a display portion 2, a main body portion 3, and coupling portions 4 that rotatably couple the display portion 2 with the main body portion 3.

The display portion 2 can be opened and closed with respect to the main body portion 3 via the coupling portions 4. The display portion 2 includes a casing 5 of the display portion 2, a display screen 6, and an LCD (Liquid Crystal Display) display panel (not shown) that is provided inside the casing 5 for performing display processing.

The casing 5 is an exterior component of the display portion 2 that accommodates a display processing unit (not shown). The display screen 6 is a screen for displaying information such as an image and faces the main body portion 3 in the closed state shown in FIG. 2.

The main body portion 3 includes a palm rest 7 that constitutes an exterior of the main body portion 3 on an upper surface side, a bottom 8 that constitutes an exterior of the main body portion 3 on a bottom surface side, a keyboard unit 9, a VGA (Video Graphics Array) connector 10, an Ethernet connector 11 for connecting with an Ethernet cable, a central processing unit (not shown), a hard disk apparatus (not shown), and an SSD (Solid State Drive).

The palm rest 7 and the bottom 8 are exterior components of the main body portion 3. The palm rest 7 and the bottom 8 are each almost plate like and constitute an exterior surface of the main body portion 3 when combined with each other. The keyboard unit 9 includes a plurality of keys, for example, and functions as an input portion of the electronic apparatus 1. To the VGA connector 10, a connector portion provided at an end portion of a VGA connector cable is connected. The connector portion includes a VGA terminal. The VGA connector 10 supplies a video signal to a display processing unit (display) (not shown) via the VGA connector cable, for example. To the Ethernet connector 11 for connecting with an Ethernet cable, a connector portion provided at an end portion of an Ethernet cable is connected. The central processing unit is mounted on a multilayer printed wiring board in the bottom 8. Upon receiving an input signal from the keyboard unit 9, the VGA connector 10, and the Ethernet connector 11 for connecting with an Ethernet cable, the central processing unit carries out various types of processing such as operational processing, control processing, image processing, and output processing to the display portion 2, thus practically functioning as a functional main body of the electronic apparatus 1. The coupling portions 4 rotatably couple the display portion 2 with the main body portion 3 as will be described later. In the state shown in FIG. 1, an angle of the display screen 6 with respect to (an upper surface of) the palm rest 7 is an obtuse angle.

Figure 3:
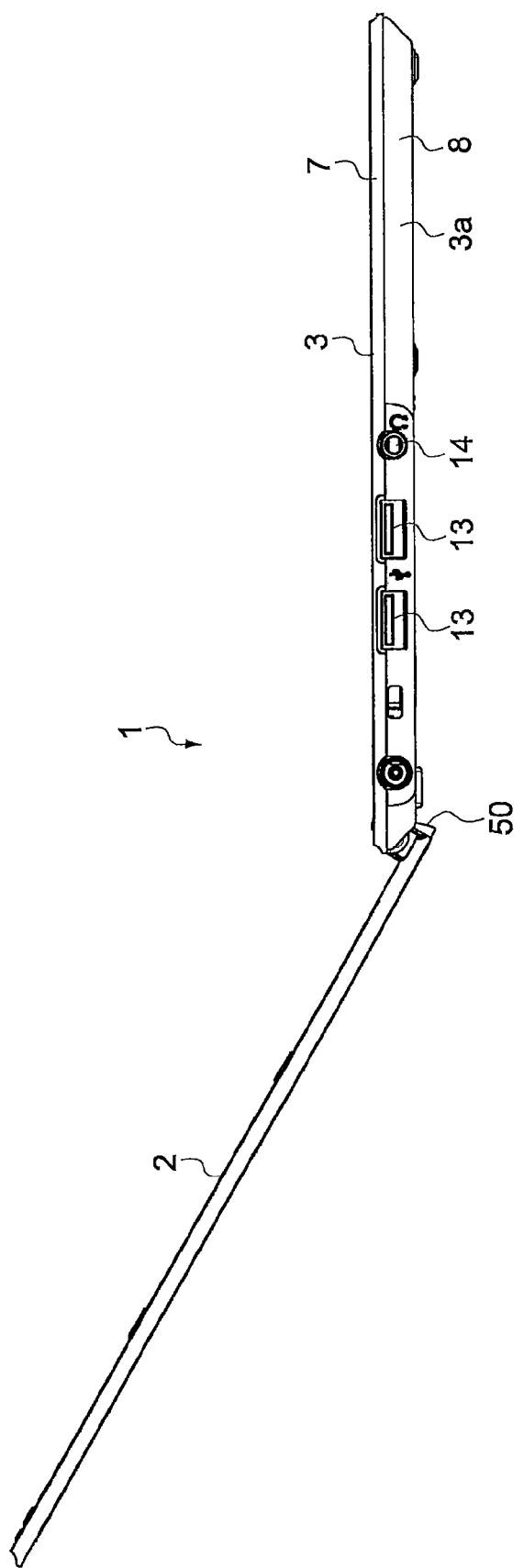
FIG. 3 is a left side view of the electronic apparatus shown in FIG. 1.

FIG. 3 is a left side view of the electronic apparatus 1 shown in FIG. 1.

On a left hand side surface 3a of the main body portion 3, connectors 13 for connecting with a plurality of LAN (Local Area Network) cables, a connector 14 for connecting with a headphone cable, and the like are provided. LAN cables are connected to the connectors 13 for connecting with a LAN cable. An earphone terminal is connected to the connector 14 for connecting with a headphone cable.

Figure 4:
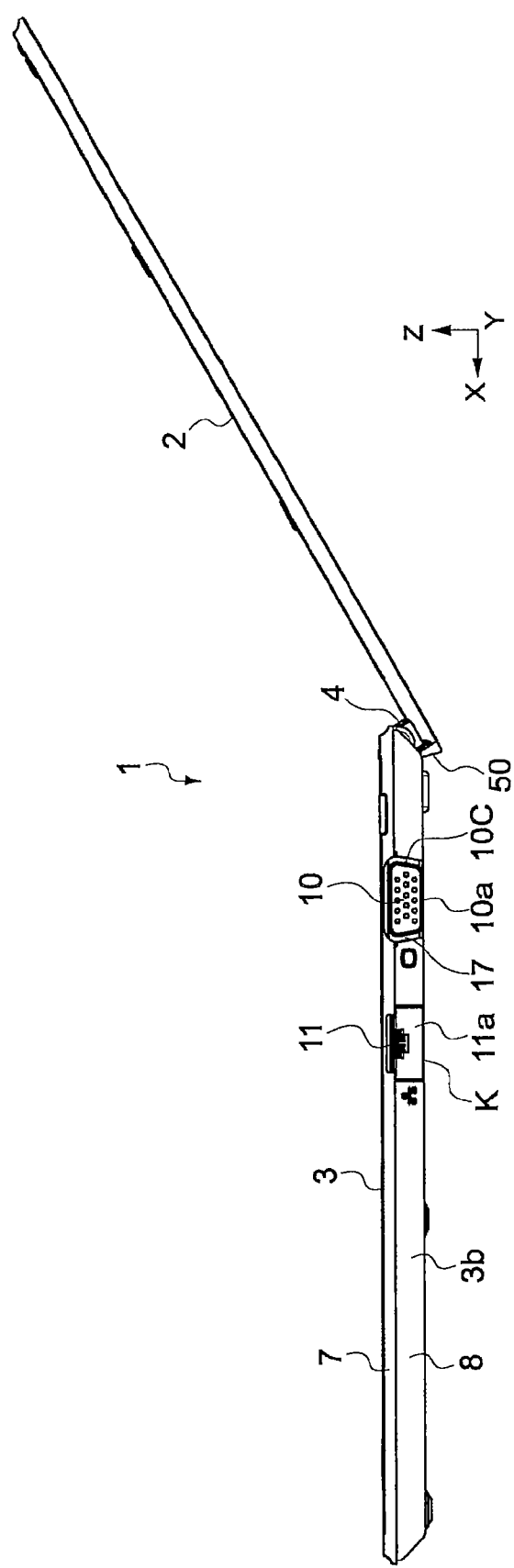
FIG. 4 is a right side view of the electronic apparatus shown in FIG. 1.

FIG. 4 is a right side view of the electronic apparatus 1 shown in FIG. 1.

On a right hand side surface 3*b* of the main body portion 3, the VGA connector 10 and the Ethernet connector 11 are provided. The VGA connector 10 is provided at a position closer to the coupling portion 4 than the Ethernet connector 11 on the right hand side surface 3*b* of the main body portion 3. The VGA connector 10 includes a VGA connector lower surface 10*a* that is exposed from a bottom surface 8*a* of the bottom 8. A position of the VGA connector lower surface 10*a* of the VGA connector 10 and a position of the bottom surface 8*a* of the main body portion 3 in a thickness direction orthogonal to the bottom surface 8*a* (Z direction in FIG. 4) are substantially the same. The VGA connector lower surface 10*a* is positioned on the same plane as an XY plane including the bottom surface 8*a* of the bottom 8. In other words, the VGA connector lower surface 10*a* does not stick out from the bottom surface 8*a* of the bottom 8 in the thickness direction of the main body portion 3 (Z direction in FIG. 4). The Ethernet connector 11 is provided more on the front side of the main body portion 3 than the VGA connector 10. The Ethernet connector 11 includes a cover 11*a* that is rotatable with the bottom surface 8*a* side of the main body portion 3 as a fulcrum as will be described later. Similarly, a position of a lower surface K of the cover 11*a* of the Ethernet connector 11 and the position of the bottom surface 8*a* in the thickness direction (Z direction in FIG. 4) are substantially the same. The Ethernet connector 11 does not stick out from the bottom surface 8*a* of the bottom 8 in the thickness direction of the main body portion 3 (Z direction in FIG. 4). A size of the ether connector 11 in the thickness direction of the main body portion 3 (Z direction in FIG. 4) is smaller than that of the VGA connector 10.

Figure 5A:
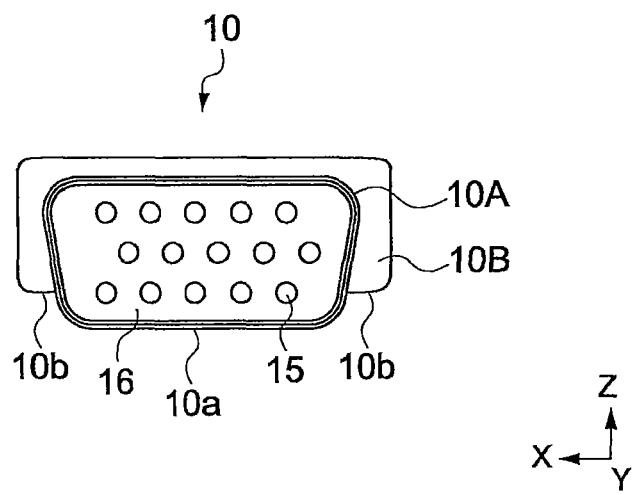
FIG. 5A is a front view of a VGA (Video Graphics Array) connector.
Figure 5B:
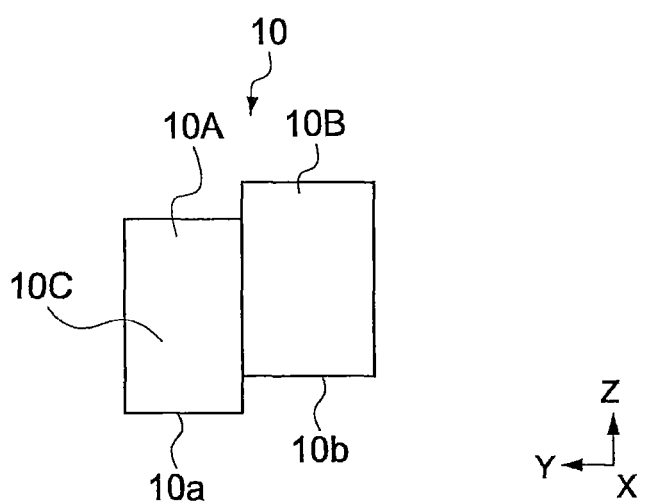
FIG. 5B is a side view of the VGA connector.
Figure 5C:
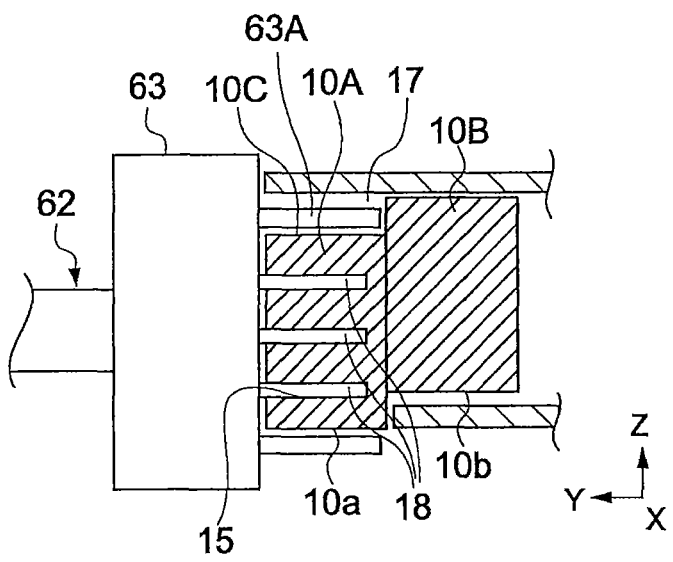
FIG. 5C is a cross sectional diagram showing a state where a connector portion provided at an end portion of a VGA connector cable is connected to the VGA connector.

FIG. 5A is a front view of the VGA connector 10, FIG. 5B is a side view of the VGA connector 10, and FIG. 5C is a cross sectional diagram showing a state where a connector portion provided at an end portion of a VGA connector cable is connected to the VGA connector 10.

The VGA connector 10 is a component incorporated into the main body portion 3. The VGA connector 10 includes a pin socket 10A and a connector base 10B.

The pin socket 10A includes a connection terminal surface 16 on which a plurality of insertion holes 15 into which VGA terminals of a connector portion of a VGA cable (not shown) are inserted are formed. By inserting the VGA terminals into the insertion holes 15, the connector portion of the VGA cable is connected to the pin socket 10A. The pin socket 10A protrudes from the connector base 10B in a Y direction.

The connector base 10B includes a connector base bottom surface 10*b* that is provided at a position higher than a position of the VGA connector lower surface 10*a* of the pin socket 10A in the thickness direction (Z direction in FIG. 5). In other words, as shown in FIG. 5A, the connector base 10B is flanged so as to protrude from the pin socket 10A on an upper side of the VGA connector 10 in the thickness direction (Z direction) and a front side (left hand side in FIG. 5) and rear side (right hand side in FIG. 5) of the VGA connector 10 in a depth direction (X direction).

A gap 17 is formed around and along a circumferential side surface 10C of the pin socket 10A (see FIGS. 4 and 5C). A connection portion 63A of a connector portion 63 provided at an end portion of a VGA connector cable 62 is fit in the gap 17, and VGA terminals 18 are inserted into the insertion holes 15.

Figure 6A:
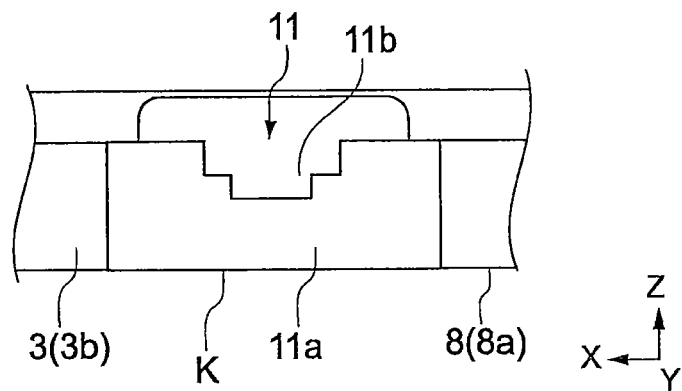
FIG. 6A is a front view of an Ethernet connector.
Figure 6B:
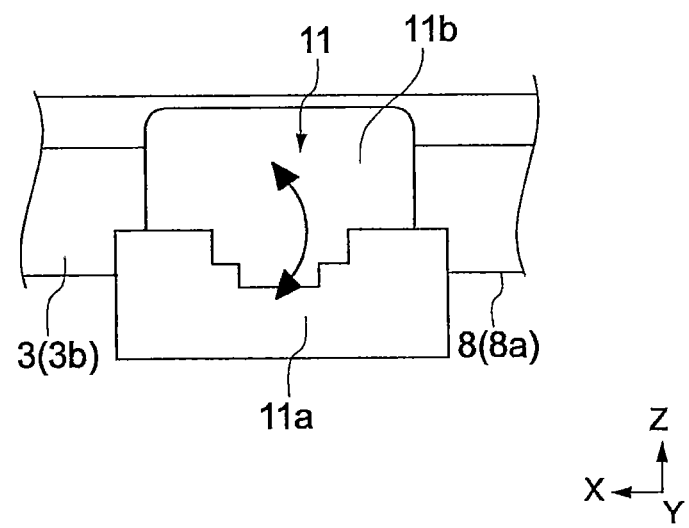
FIG. 6B is a front view showing a state where a cover of the Ethernet connector is opened.
Figure 6C:
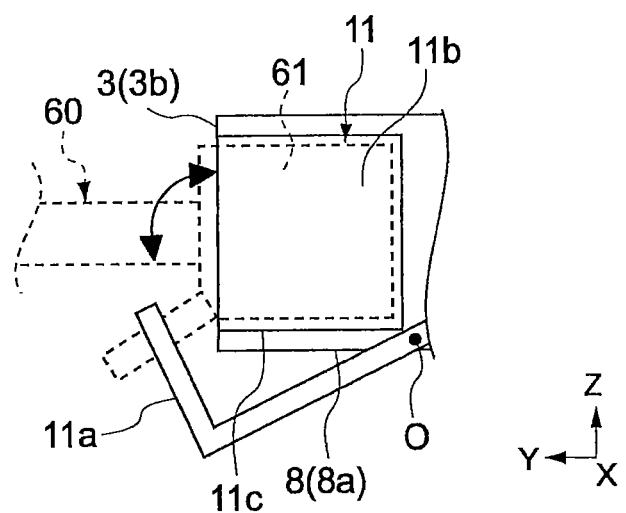
FIG. 6C is a side view showing the state where the cover of the Ethernet connector is opened.

FIG. 6A is a front view of the Ethernet connector 11, FIG. 6B is a front view showing a state where the cover 11*a* of the Ethernet connector 11 is opened, and FIG. 6C is a side view showing the state where the cover 11*a* of the Ethernet connector 11 is opened.

Using a fulcrum O as a rotary axis, the cover 11*a* is rotatable with respect to the main body portion 3 between the state shown in FIG. 6A where the cover 11*a* is closed with respect to the right hand side surface 3*b* of the main body portion 3 and the state shown in FIGS. 6B and 6C where the cover 11*a* is opened with respect to the right hand side surface 3*b* of the main body portion 3. A cross sectional shape of the cover 11*a* is approximately an L shape. A part of a terminal portion 11*b* of the Ethernet connector 11 and a lower surface 11*c* are covered by the cover 11*a* at a time the cover 11*a* is closed with respect to the right hand side surface 3*b* of the main body portion 3 (FIG. 6A). At this time, other parts of the terminal portion 11*b* of the Ethernet connector 11 are exposed. The cover 11*a* is exposed from the bottom surface 8*a* of the bottom 8. The terminal portion of the Ethernet connector 11 is exposed at a time the cover 11*a* is opened with respect to the right hand side surface 3*b* of the main body portion 3 (FIGS. 6B and 6C). At this time, the Ethernet connector 11 becomes connectable with a connector portion 61 provided at an end portion of an Ethernet cable 60, and the opened cover 11*a* is positioned to be lower than the bottom surface 8*a* of the bottom 8 in the thickness direction (Z direction).

(Structure of Bottom Tilt Foot)

Figure 7:
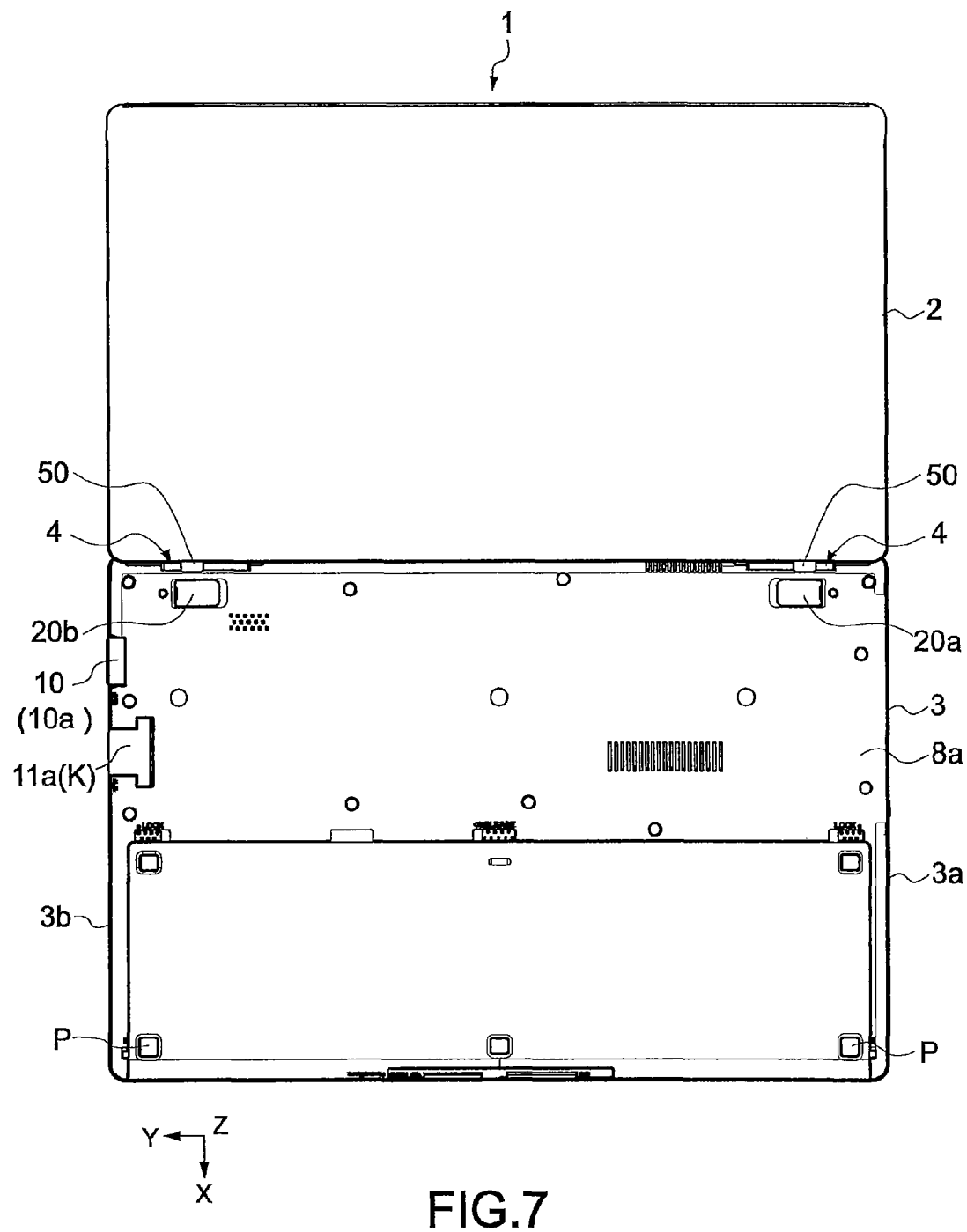
FIG. 7 is a bottom view of the electronic apparatus shown in FIG. 1.

FIG. 7 is a bottom view of the electronic apparatus 1 shown in FIG. 1.

On the bottom surface 8*a* of the main body portion 3, a pair of bottom tilt foots 20*a* and 20*b* are provided in the vicinity of the coupling portions 4. The bottom tilt foot 20*a* is provided on the left hand side surface 3*a* side in a width direction (Y direction in FIG. 7), and the bottom tilt foot 20*b* is provided on the right hand side surface 3*b* side in the width direction (Y direction in FIG. 7). The bottom tilt foots 20*a* and 20*b* are formed to be substantially rectangular and each have a longitudinal direction in the width direction (Y direction in FIG. 7). In addition, a plurality of cushion portions P that each function as a cushion at a time the main body portion 3 is placed on a placement surface are provided on the bottom surface 8*a* of the bottom 8. The cushion portions P are provided near corner portions on the front side of the main body portion 3 in the depth direction (X direction in FIG. 7).

Figure 8:
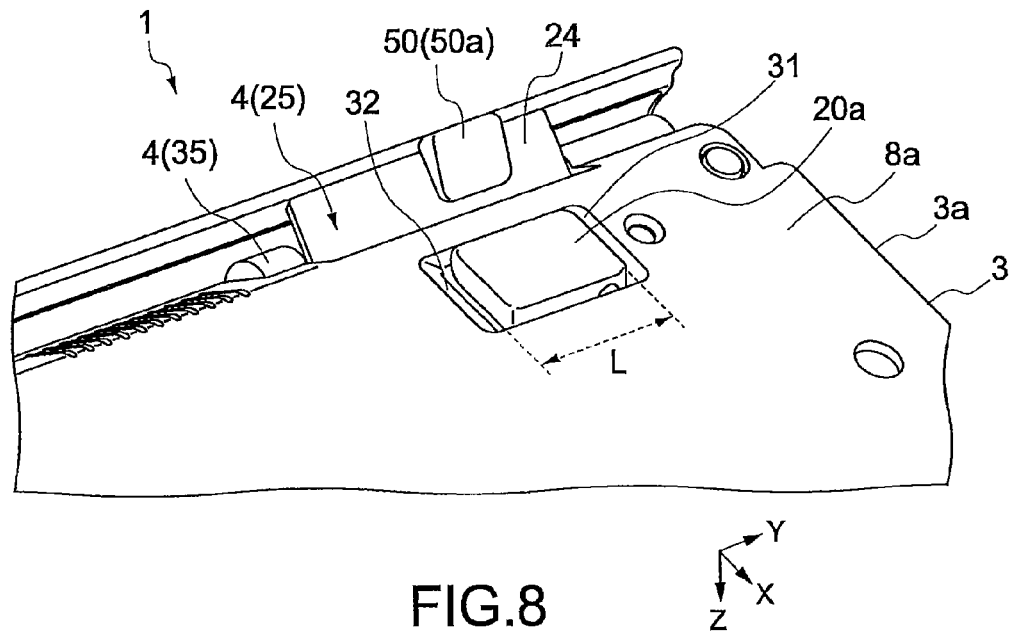
FIG. 8 is a partially enlarged perspective view showing a portion in the vicinity of a bottom tilt foot on a bottom surface of the electronic apparatus shown in FIG. 7.
Figure 9:
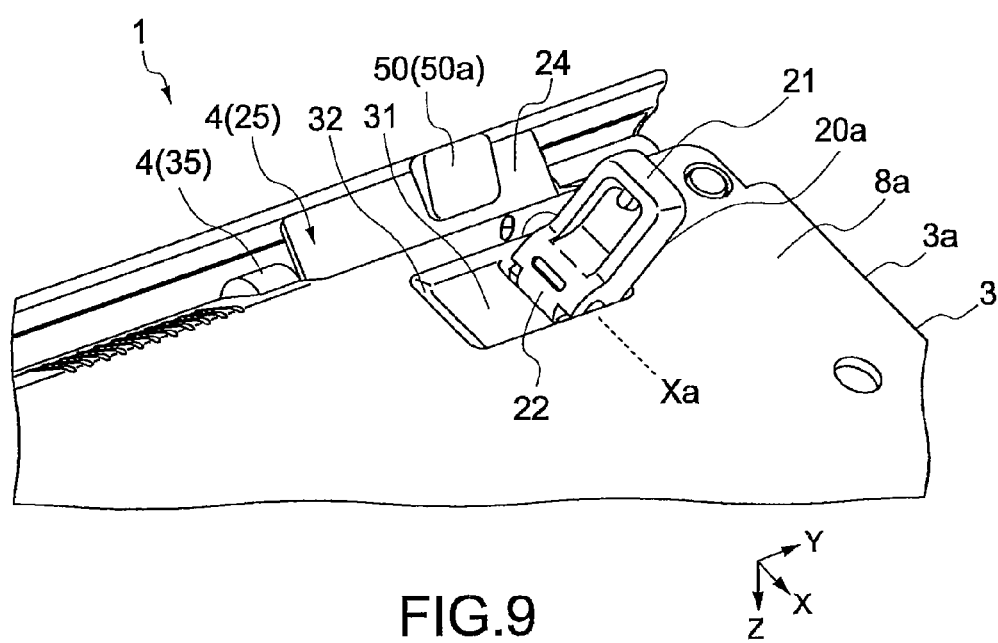
FIG. 9 a partially enlarged perspective view showing a state where the bottom tilt foot of the electronic apparatus shown in FIG. 8 is opened.

FIG. 8 is a partially enlarged perspective view showing a portion in the vicinity of the bottom tilt foot 20*a* on the bottom surface 8*a* of the electronic apparatus 1 shown in FIG. 7. FIG. 9 a partially enlarged perspective view showing a state where the bottom tilt foot 20*a* of the electronic apparatus 1 shown in FIG. 8 is opened.

A substantially rectangular dented portion 31 for accommodating the bottom tilt foot 20*a* is formed on the bottom surface 8*a* of the main body portion 3 (bottom 8). Most of the bottom tilt foot 20*a* is accommodated in the dented portion 31 when closed with respect to the main body portion 3 as shown in FIG. 8. When opened with respect to the main body portion 3 as shown in FIG. 9, the bottom tilt foot 20*a* is positioned while tilting a predetermined angle with respect to the bottom surface 8*a* of the main body portion 3 outside the dented portion 31. A tip end surface 21 of the bottom tilt foot 20*a* is placed on a placement surface such as an upper surface of a desk.

In other words, the bottom tilt foot 20*a* includes a rotary shaft portion 22 at an end portion thereof closer to the left hand side surface 3*a* in the longitudinal direction (Y direction in FIG. 8). The rotary shaft portion 22 is pivotally supported by a bearing (not shown) of the main body portion 3. The bottom tilt foot 20a is rotatable with respect to the main body portion 3 using a rotary shaft Xa of the rotary shaft portion 22 as a shaft. The rotary shaft Xa of the bottom tilt foot 20a extends in the same direction as the depth direction (X direction in FIG. 9). When the bottom tilt foot 20a is opened (FIG. 9), the tip end surface 21 of the bottom tilt foot 20a comes closer to the left hand side surface 3a than the rotary shaft Xa. In other words, a maximum rotational angle θ of the bottom tilt foot 20a with respect to the main body portion 3 is an obtuse angle.

A length of the bottom tilt foot 20a in the longitudinal direction (Y direction in FIG. 8) is a length L. A size of a gap formed between the placement surface and the bottom surface 8a of the main body portion 3 is determined based on the length L, the maximum rotational angle θ, and the like. In other words, an inclination angle of the bottom surface 8a of the main body portion 3 with respect to the placement surface is determined. The length L and the maximum rotational angle θ can be changed as appropriate based on the requisite size of the gap, inclination angle of the bottom surface 8a, and the like.

A depth of the dented portion 31 is set such that the bottom tilt foot 20a partially protrudes from the bottom surface 8a in the thickness direction (Z direction in FIG. 8) in the state where the bottom tilt foot 20a is closed as shown in FIG. 8. A tilted surface 32 that helps a user to hook a finger on the bottom tilt foot 20a for opening the bottom tilt foot 20a is formed in the dented portion 31. It should be noted that since the bottom tilt foot 20b has a structure almost symmetric with the bottom tilt foot 20a with respect to a center axis that passes a center of the main body portion 3 and is parallel to the X direction, descriptions thereof will be omitted.

Figure 10:
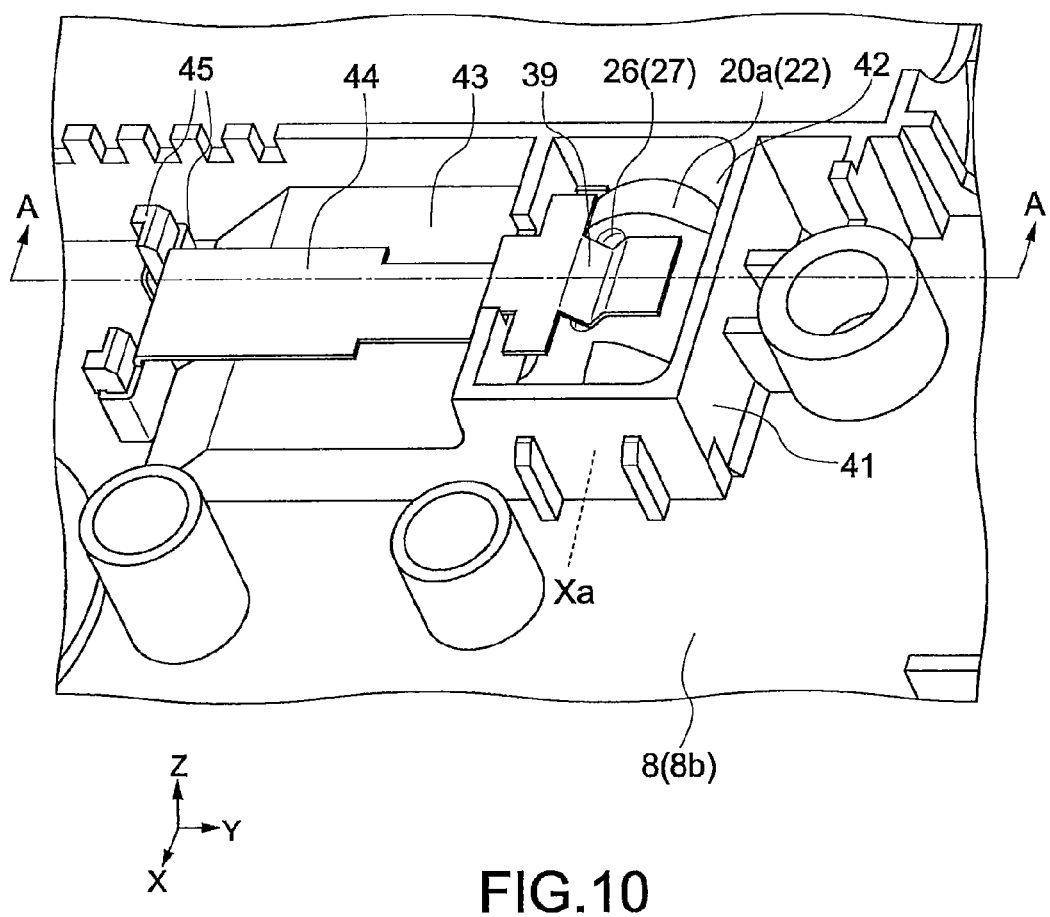
FIG. 10 is a perspective view of a rotary mechanism of the bottom tilt foot of the electronic apparatus.
Figure 11:
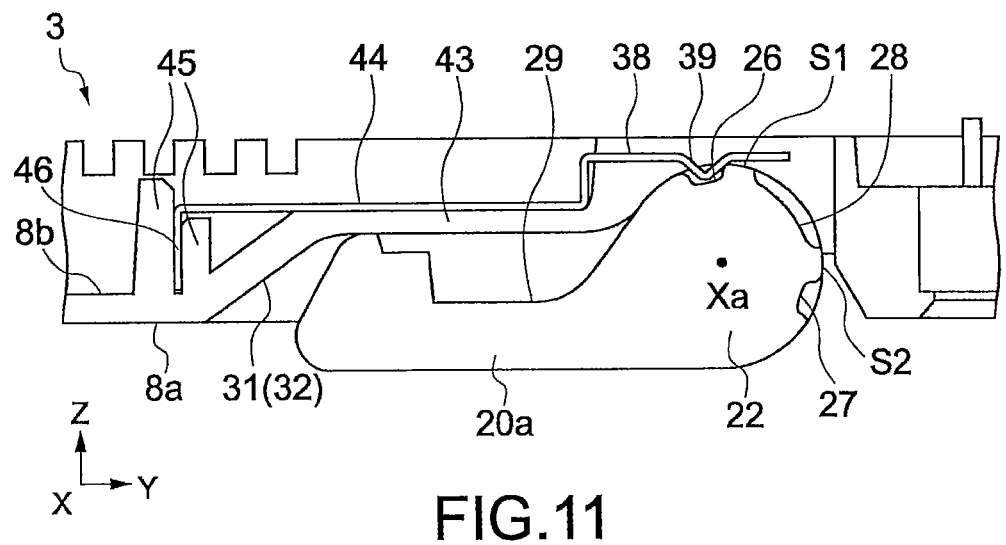
FIG. 11 is a cross sectional diagram taken along the line AA of FIG. 10 in a state where the bottom tilt foot is closed.
Figure 12:
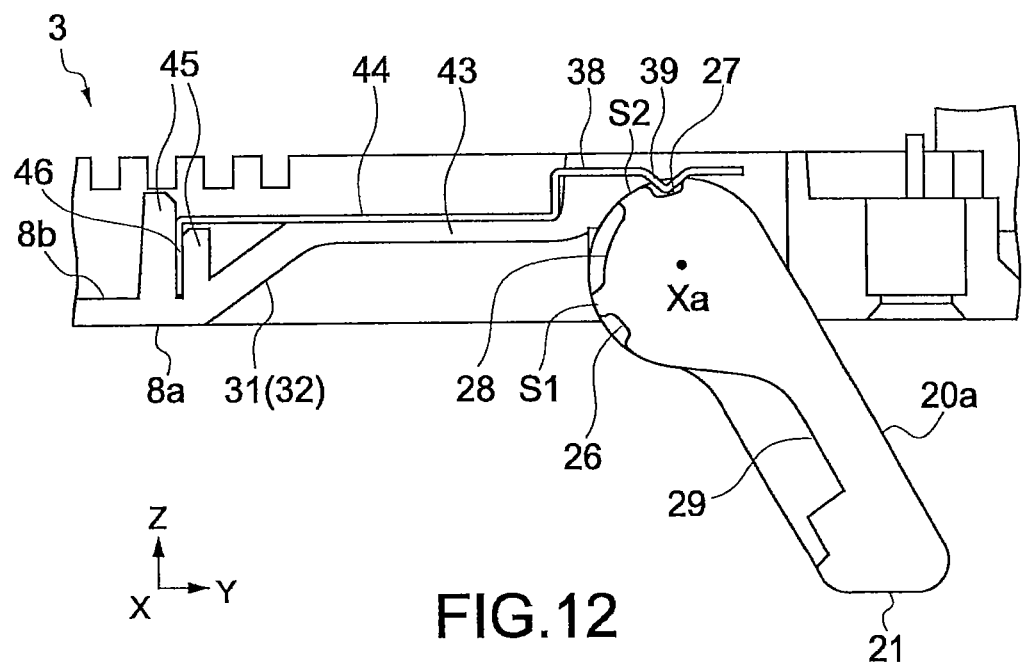
FIG. 12 is a cross sectional diagram taken along the line AA of FIG. 10 in a state where the bottom tilt foot is opened.

FIG. 10 is a perspective view of a rotary mechanism of the bottom tilt foot 20a of the electronic apparatus 1 shown in FIG. 8. FIG. 11 is a cross sectional diagram taken along the line AA of FIG. 10 in the state where the bottom tilt foot 20a is closed. FIG. 12 is a cross sectional diagram taken along the line AA of FIG. 10 in the state where the bottom tilt foot 20a is opened.

An accommodation portion 41 having a substantially rectangular cylinder shape for accommodating the rotary shaft portion 22 of the bottom tilt foot 20a is provided on the bottom surface 8a of the bottom 8. On the bottom surface 8a of the bottom 8, a substantially rectangular hole 42 surrounded by the accommodation portion 41 is formed. Inside the hole 42, the rotary shaft portion 22 is pivotally supported by the bearing (not shown) while being rotatable with the rotary shaft Xa as a shaft. The bottom 8 includes a bottom plate 43 and a pair of holding portions 45 opposed to each other. The bottom plate 43 is a wall forming the dented portion 31 and constitutes the dented portion 31. The pair of holding portions 45 protrude from an inner bottom surface 8b of the bottom 8.

Metal is used as a constituent material of a leaf spring 44 for improving durability. The leaf spring 44 is placed on top of the bottom plate 43. An end portion 46 of the leaf spring 44 is bent to be orthogonal to the part where the leaf spring 44 overlaps the bottom plate 43. The end portion 46 is held by the pair of holding portions 45 opposed to each other (see FIGS. 11 and 12). A protrusion 39 that is substantially V shaped protrudes from the other end portion 38 of the leaf spring 44 toward the bottom tilt foot 20a.

On an outer circumferential surface of the rotary shaft portion 22 of the bottom tilt foot 20a, two grooves 26 and 27 and a concave portion 28 are formed.

The groove 26 is a groove that has a substantially concave cross section. A length of the groove 26 in the longitudinal direction (X direction in FIG. 10) is slightly longer than that of the protrusion 39 of the leaf spring 44 in the longitudinal direction (X direction in FIG. 10). The protrusion 39 fits in the groove 26 when the bottom tilt foot 20a is closed with respect to the main body portion 3 as shown in FIG. 11.

As shown in FIGS. 11 and 12, the groove 27 has the same shape as the groove 26 and is formed apart from the groove 26 on the outer circumferential surface of the rotary shaft portion 22. In other words, the groove 27 is formed such that the protrusion 39 fits therein at the time the bottom tilt foot 20a is opened with respect to the main body portion 3 as shown in FIG. 12. The cross sectional shapes of the grooves 26 and 27 can be changed as appropriate based on the shape of the protrusion 39.

The concave portion 28 is formed between the grooves 26 and 27 along the outer circumferential surface of the rotary shaft portion 22 in a circumferential direction. The concave portion 28 is provided apart from the grooves 26 and 27 in the circumferential direction. A gap between the concave portion 28 and the groove 26 in the circumferential direction and a gap between the concave portion 28 and the groove 27 in the circumferential direction can be changed as appropriate. A length of the concave portion 28 in the X direction is substantially the same as the lengths of the grooves 26 and 27 in the X direction.

A notched portion 29 is formed on the bottom tilt foot 20a. The notched portion 29 is formed on the bottom tilt foot 20a on a side that faces the bottom plate 43 in the state where the bottom tilt foot 20a is closed with respect to the main body portion 3 as shown in FIG. 11.

(Operation of Bottom Tilt Foot 20a)

Next, an operation carried out at a time a user opens the bottom tilt foot 20a as shown in FIG. 12 from the closed state shown in FIG. 11 will be described.

When the bottom tilt foot 20a is closed as shown in FIG. 11, most of the bottom tilt foot 20a is accommodated in the dented portion 31. The protrusion 39 of the leaf spring 44 is fit in the groove 26 of the bottom tilt foot 20a. At this time, the leaf spring 44 is placed on top of the bottom plate 43.

When a predetermined force that acts against an elastic force of the leaf spring 44 is applied to the bottom tilt foot 20a by the user, the bottom tilt foot 20a starts to rotate while the protrusion 39 is in contact with the groove 26, and the protrusion 39 is thus brought into contact with a first circumferential surface S1. At this time, the leaf spring 44 is raised so as to be brought apart from the bottom plate 43 in a state where the end portion 46 is held by the pair of holding portions 45.

Further, when a force is applied to the bottom tilt foot 20a, the bottom tilt foot 20a rotates while being applied with a force from the leaf spring 44 in the state where the protrusion 39 is in contact with the first circumferential surface S1, and the protrusion 39 then fits in the concave portion 28. When the bottom tilt foot 20a rotates to a position at which it comes into contact with a second circumferential surface S2 since having been fit in the concave portion 28, the bottom tilt foot 20a is hardly applied with an elastic force from the leaf spring 44.

Furthermore, when a predetermined force that acts against the elastic force of the leaf spring 44 is applied to the bottom tilt foot 20a by the user, the bottom tilt foot 20a starts to rotate while the protrusion 39 is in contact with the concave portion 28, and the protrusion 39 is then brought into contact with the second circumferential surface S2. At this time, the leaf spring 44 is raised so as to be brought apart from the bottom plate 43 in a state where the end portion 46 is held by the pair of holding portions 45.

Further, when a force is applied to the bottom tilt foot 20*a*, the bottom tilt foot 20*a* rotates while being applied with a force from the leaf spring 44 in the state where the protrusion 39 is in contact with the second circumferential surface S2, and the protrusion 39 then fits in the groove 27 as shown in FIG. 12. At this time, the user can feel a locked state of the bottom tilt foot 20*a*. As described above, the bottom tilt foot 20*a* is positioned at a predetermined rotational angle with respect to the main body portion 3.

Figure 13:
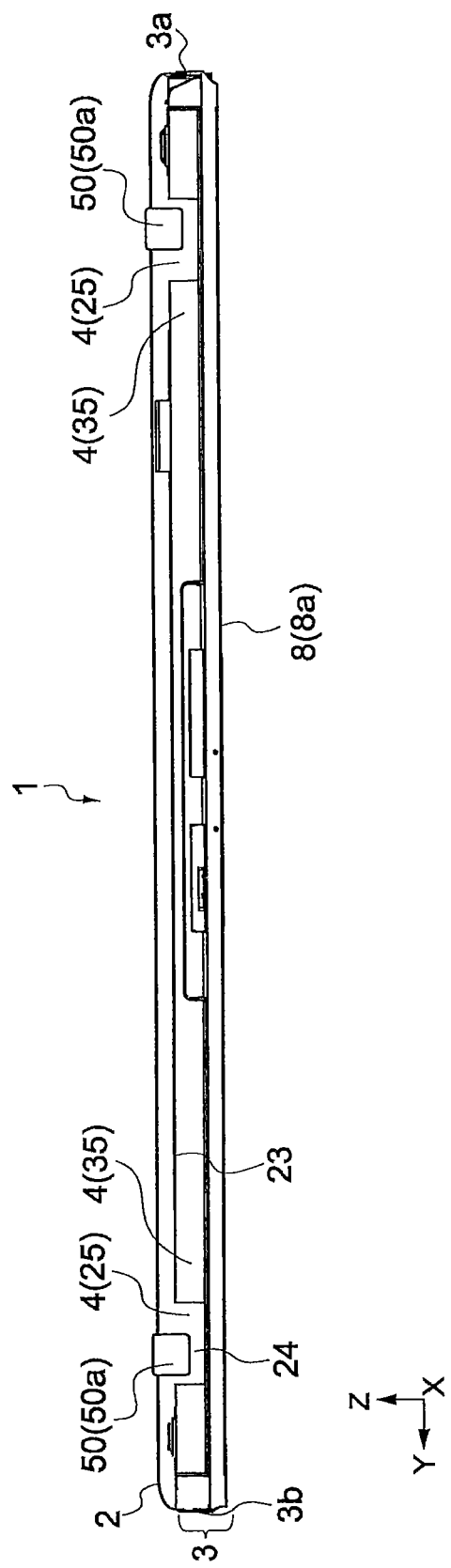
FIG. 13 is a back view of the electronic apparatus shown in FIG. 2.
Figure 14:
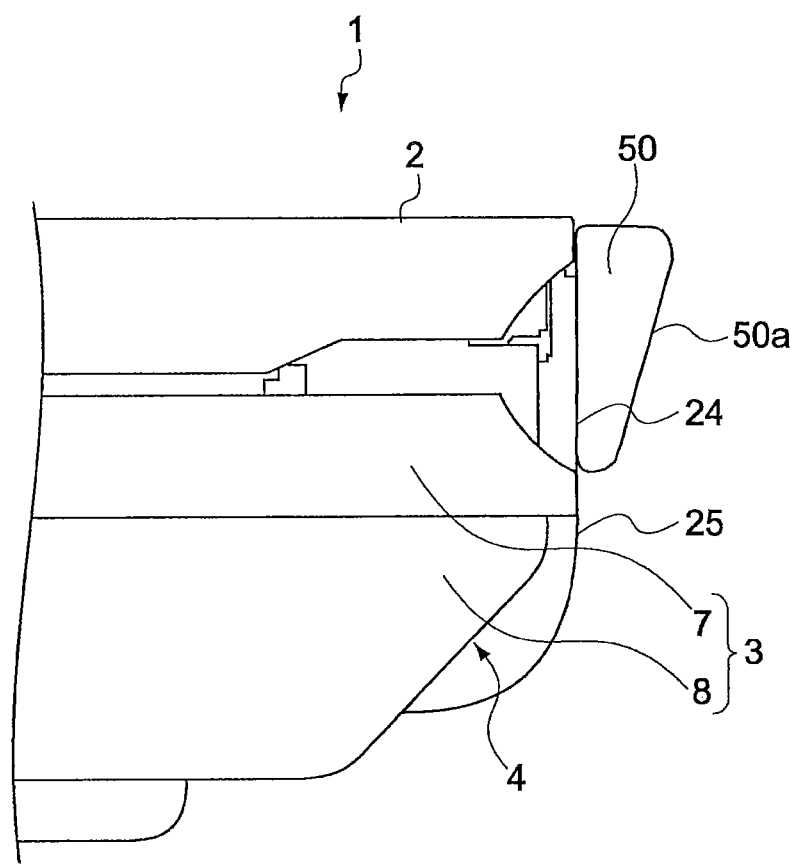
FIG. 14 is a side view of a portion in the vicinity of a coupling portion of the electronic apparatus shown in FIG. 13.
Figure 15:
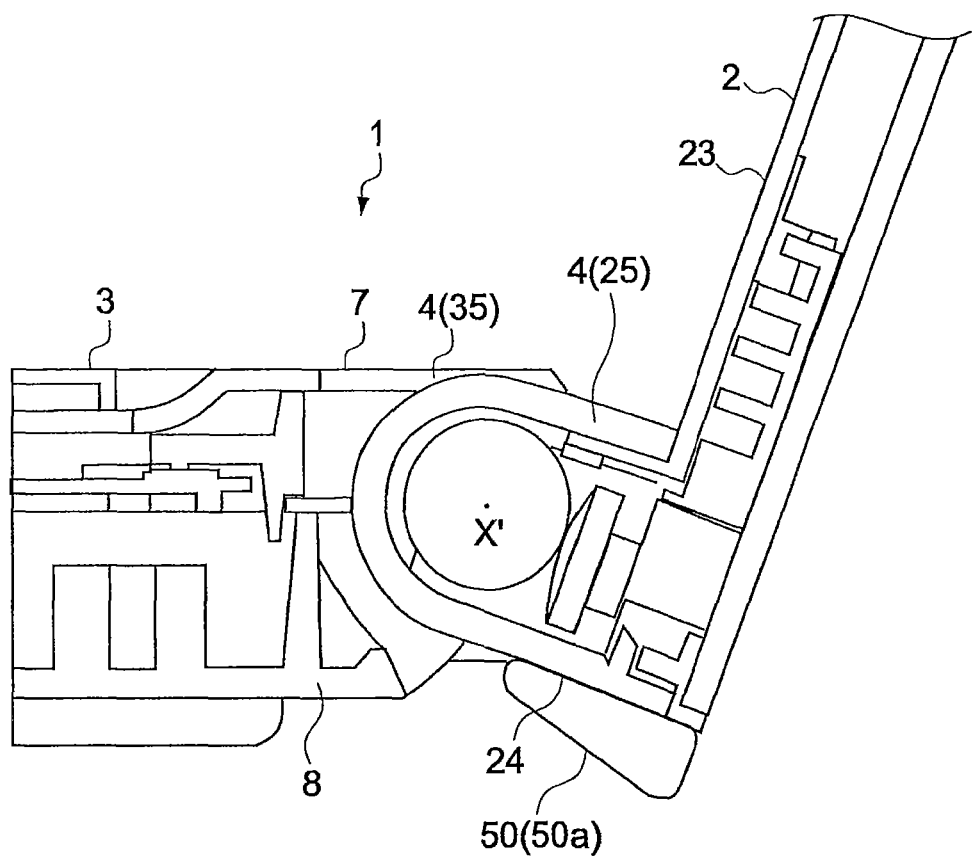
FIG. 15 is a cross sectional diagram showing a structure in the vicinity of the coupling portion of the electronic apparatus shown in FIG. 1.

FIG. 13 is a back view of the electronic apparatus shown 1 in FIG. 2. FIG. 14 is a side view of a portion in the vicinity of the coupling portions 4 of the electronic apparatus 1 shown in FIG. 13. FIG. 15 is a cross sectional diagram showing a structure of the coupling portion 4 of the electronic apparatus 1 shown in FIG. 1.

The display portion 2 includes two coupling shaft portions 25 that constitute a part of the coupling portions 4 as shown in FIG. 14. The coupling shaft portions 25 each protrude from a surface 23 of the display portion 2 on a side opposed to the main body portion 3 in the thickness direction of the display portion 2 (Z direction in FIG. 13). While being rotatable about a rotary shaft X', the coupling shaft portions 25 are coupled with coupling shaft portions 35 that constitute a part of the coupling portions 4 as shown in FIG. 15 using coupling hinges.

(Tilt Cushion)

Tilt cushions 50 as leg portions are provided on a back surface 24 of the display portion 2 (back surface 24 of coupling shaft portions 25). Each of the tilt cushions 50 is substantially rectangular as shown in FIG. 13 and formed of a synthetic resin having elasticity. A shape of a side surface of each of the tilt cushions 50 is approximately a right angle triangle as shown in FIG. 14. The tilt cushions 50 each include a tilted surface 50*a* whose distance from the back surface 24 in the depth direction increases in the thickness direction of the main body portion 3 as shown in FIG. 14.

(Operation Etc.)

Figure 16:
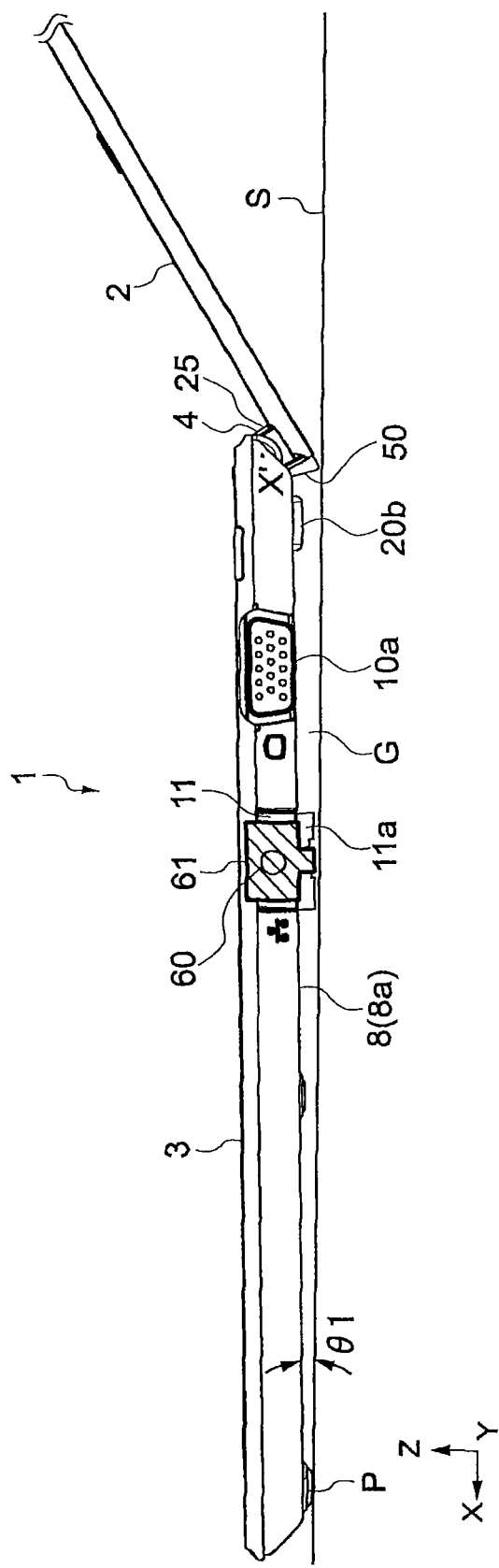
FIG. 16 is a side view showing an example that uses a tilt cushion of the electronic apparatus.

FIG. 16 is a side view showing an example that uses the tilt cushions 50 of the electronic apparatus 1.

In this example, the main body portion 3 is placed on a placement surface S while the display portion 2 is opened with respect to the main body portion 3 (second state). At this time, the main body portion 3 is supported on the placement surface S by the plurality of cushion portions P and two tilt cushions 50. An angle of the bottom surface 8*a* of the main body portion 3 with respect to the placement surface S is referred to as first angle θ1. Moreover, the cover 11*a* is opened with respect to the main body portion 3, and the connector portion 61 provided at the end portion of the Ethernet cable 60 is connected to the Ethernet connector 11. The connector portion 61 includes a picking portion. It should be noted that a VGA connector cable is not connected to the VGA connector 10. At this time, the bottom tilt foots 20*a* and 20*b* are closed and are apart from the placement surface S (first rotational position).

Figure 21A:
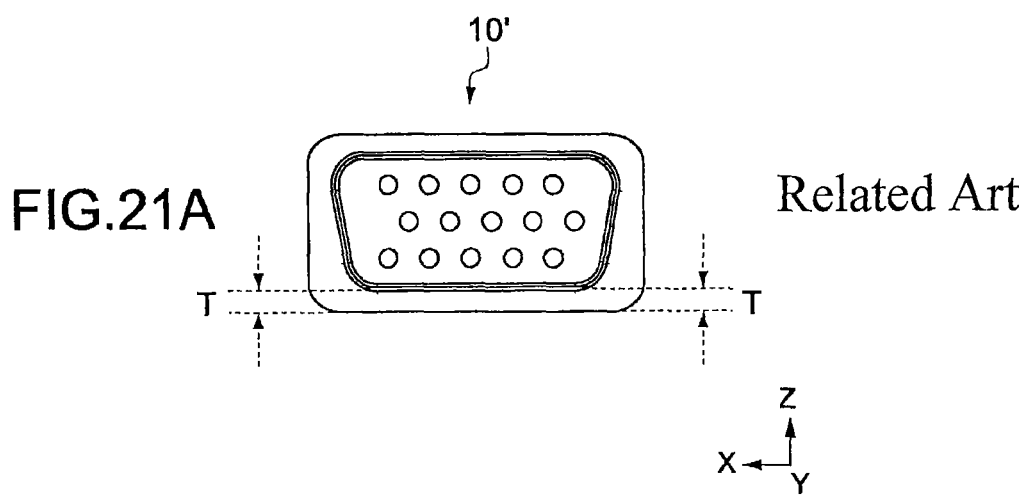
FIG. 21A is a front view showing a VGA connector of the related art.
Figure 21B:
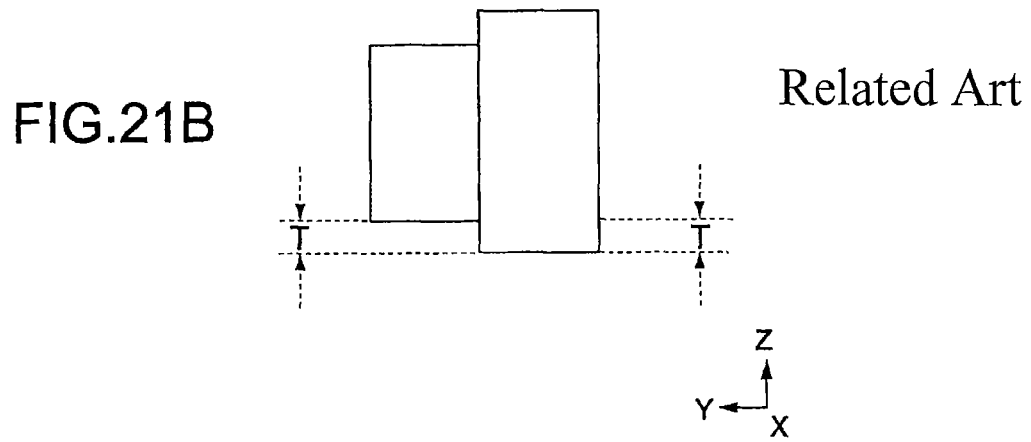
FIG. 21B is a side view of the VGA connector shown in FIG. 21A.

In this example, the VGA connector 10 of the electronic apparatus 1 includes the VGA connector lower surface 10*a* that is positioned on the same plane as the plane including the bottom surface 8*a* of the bottom 8. In other words, the position of the VGA connector lower surface 10*a* of the VGA connector 10 and that of the bottom surface 8*a* in the thickness direction of the main body portion 3 are substantially the same. Comparing with a VGA connector 10' of the related art shown in FIG. 21, since the VGA connector 10 does not include a flanged portion having a thickness T at a position lower than the position indicated by the broken lines in FIG. 21, the thickness of the VGA connector 10 can be reduced that much, with the result that the thickness of the main body portion 3 can be reduced.

Further, the Ethernet connector 11 includes the cover 11*a* that is rotatable about the fulcrum O on the bottom surface 8*a* side of the main body portion 3. Therefore, a connector portion 61 thicker than the main body portion 3 can be connected to the Ethernet connector 11 as shown in FIG. 16.

Furthermore, when the connector portion 61 is connected to the Ethernet connector 11, the cover 11*a* is located below the main body portion 3. Therefore, when the display portion 2 does not include the tilt cushions 50, there is a fear that the cover 11*a* and the placement surface S may interfere with each other at a time the main body portion 3 is placed on the placement surface S while the display portion 2 is opened with respect to the main body portion 3 and the placement condition of the main body portion 3 may thus become unstable.

Since the tilt cushions 50 are provided on the back surface 24 of (the coupling shaft portions 25 of) the display portion 2 in this example, the tilt cushions 50 rotate integrally with the display portion 2 about the rotary shaft X' along with the rotation of the display portion 2 with respect to the main body portion 2 until reaching a predetermined angle shown in FIG. 16. Thus, the tilt cushions 50 are located below the bottom surface 8*a* of the main body portion 3. When the electronic apparatus 1 is placed on the placement surface S in the state shown in FIG. 16, the bottom surface 8*a* of the main body portion 3 (bottom 8) tilts with respect to the placement surface S by the first angle θ1, with the result that a gap G for accommodating the cover 11*a* is formed between the bottom surface 8*a* of the main body portion 3 and the placement surface S. As a result, an interference between the cover 11*a* and the placement surface S can be prevented from occurring. With such a structure, a stability of the placement condition of the electronic apparatus 1 in a state where the display portion 2 is opened and the Ethernet cable 60 is connected can be secured.

Figure 17:
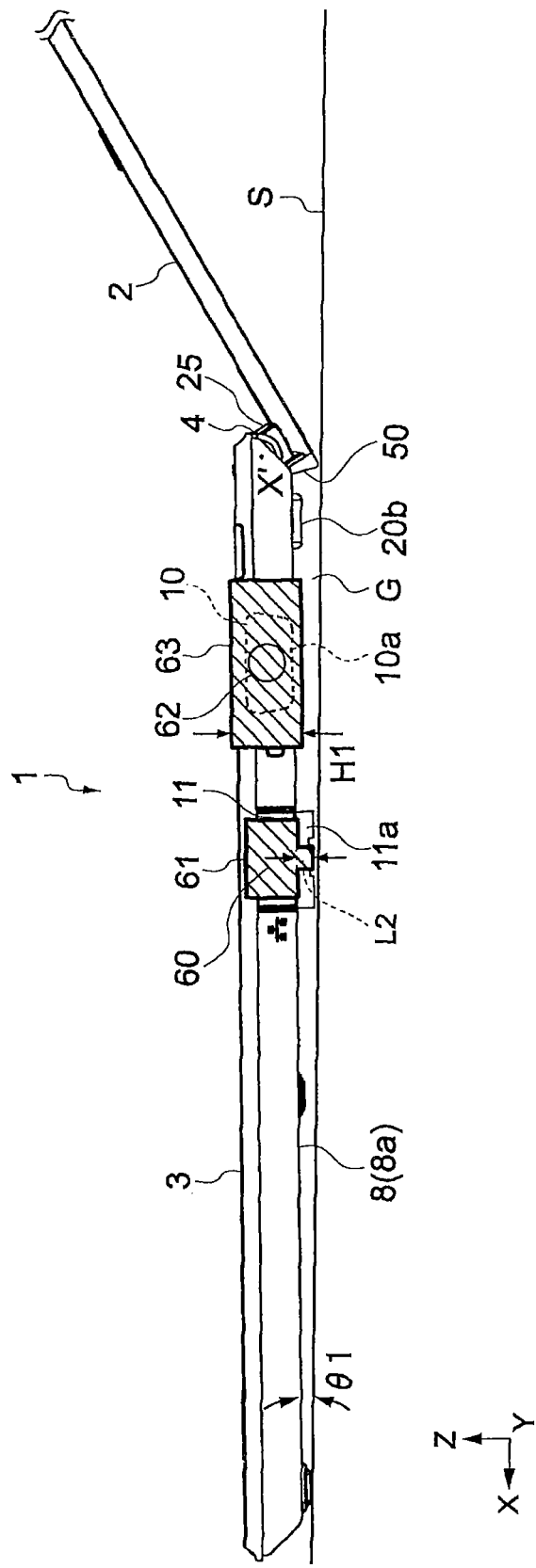
FIG. 17 is a side view showing another example that uses the tilt cushion.

FIG. 17 is a side view showing another example that uses the tilt cushions 50.

In this and subsequent examples, components having the same structures as those of the above example will be denoted by the same symbols, and descriptions thereof will be omitted. In addition, different points will mainly be described.

In this example, while the connector portion 61 is connected to the Ethernet connector 11, the connector portion 63 provided at the end portion of the VGA connector cable 62 is connected to the VGA connector 10.

When a thickness H1 of the connector portion 63 is slightly larger than the thickness of the main body portion 3, the interference between the cover 11*a* and the placement surface S and that between the connector portion 63 and the placement surface S can be prevented from occurring by the gap G formed by the tilt cushions 50 without having to open the bottom tilt foots 20*a* and 20*b*. As a result, a stability of the placement condition of the main body portion 3 in a state where the display portion 2 is opened and the Ethernet cable 60 and the VGA connector cable 62 are connected can be secured.

Figure 18:
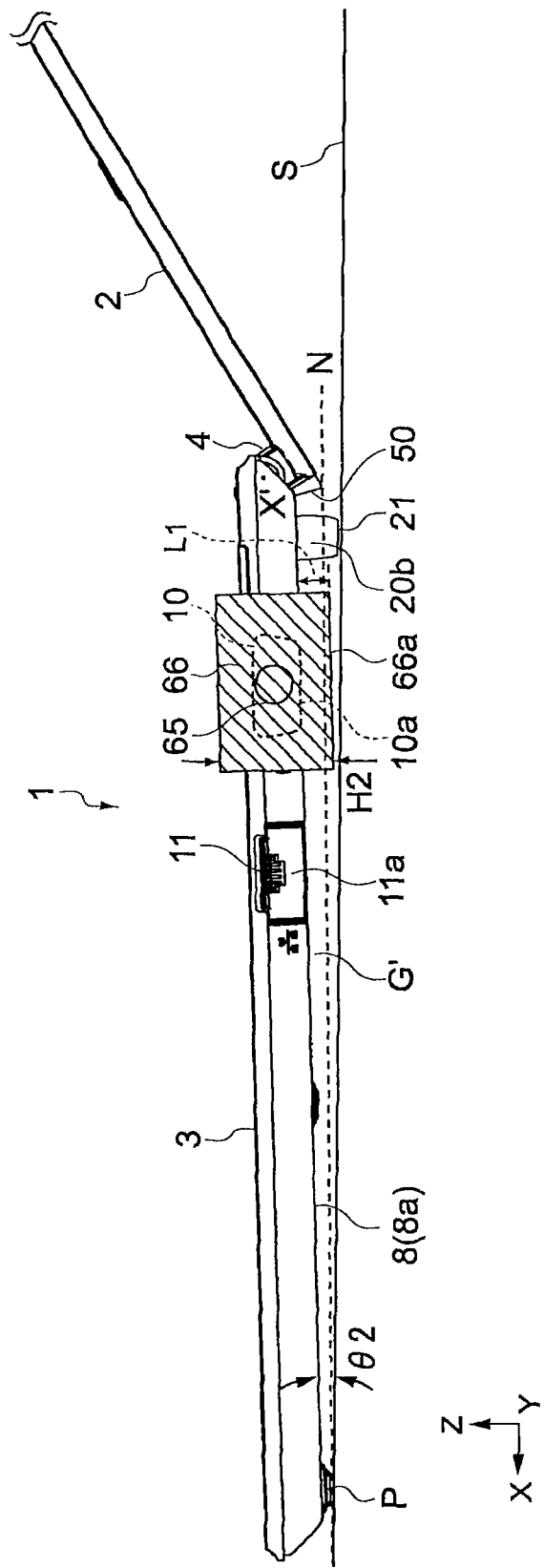
FIG. 18 is a side view showing an example that uses the bottom tilt foot.

FIG. 18 is a side view showing an example that uses the bottom tilt foots 20*a* and 20*b* of the electronic apparatus 1.

In this example, a connector portion 66 provided at an end portion of a VGA connector cable 65 is connected to the VGA connector 10 as shown in FIG. 18. A thickness of the connector portion 66 is a thickness H2 that is larger than the thickness of the main body portion 3. At this time, at least a part of the connector portion 66 is located below a virtual straight line N connecting the cushion portion P and the tilt cushion 50. In other words, a length L1 of a bottom surface 66a of the connector portion 66 sticking out from the bottom surface 8a of the main body portion 3 in the thickness direction is longer than a length L2 of the connector portion 61 (picking portion) shown in FIG. 17 sticking out from the bottom surface 8a of the main body portion 3 in the thickness direction. In this case, when the main body portion 3 is placed on the placement surface S without opening the bottom tilt foots 20a and 20b, the connector portion 66 and the placement surface S interfere with each other. As a result, there is a fear that the placement condition of the main body portion 3 may become unstable.

In this example, the bottom tilt foots 20a and 20b are opened with respect to the bottom surface 8a of the main body portion 3 at the second rotational position as shown in FIG. 18. When the cushion portions P and the bottom tilt foots 20a and 20b of the main body portion 3 are placed on the placement surface S in this state, the bottom tilt foots 20a and 20b are brought into contact with the placement surface S and support the main body portion 3 in a state where the tilt cushions 50 float from the placement surface S. At this time, the angle of the bottom surface 8a with respect to the placement surface S becomes a second angle θ2 larger than the first angle θ1, and a gap G' is formed between the bottom surface 8a of the main body portion 3 and the placement surface S. A gap is also formed between the bottom surface 66a of the connector portion 66 and the placement surface S. As a result, the connector portion 66 is prevented from coming into contact with the placement surface S, and a stability of the placement condition of the electronic apparatus 1 at a time the VGA connector cable 65 is connected can be secured.

Moreover, at a time the user performs an input operation or the like in a state where the main body portion 3 is placed on the placement surface S while the display portion 2 is opened with respect to the main body portion 3 (see FIG. 18), it becomes easier to apply a force in the depth direction of the main body portion 3 (X direction in FIG. 18). The bottom tilt foots 20a and 20b rotate so that the maximum rotational angle θ with respect to the main body portion 3 becomes an obtuse angle as shown in FIG. 9 using the rotary shaft Xa extending in the depth direction (direction substantially parallel to X direction in FIG. 18) as a rotary shaft. With such a structure, even when a force is applied to the main body portion 3 in the depth direction (X direction in FIG. 18) at the time the user performs an input operation or the like, it is possible to prevent the bottom tilt foots 20a and 20b from closing. Further, the bottom tilt foots 20a and 20b can be opened and closed with ease while the user is holding the main body portion 3. In addition, design of the bottom tilt foots 20a and 20b in the opened/closed states can be improved.

Figure 19:
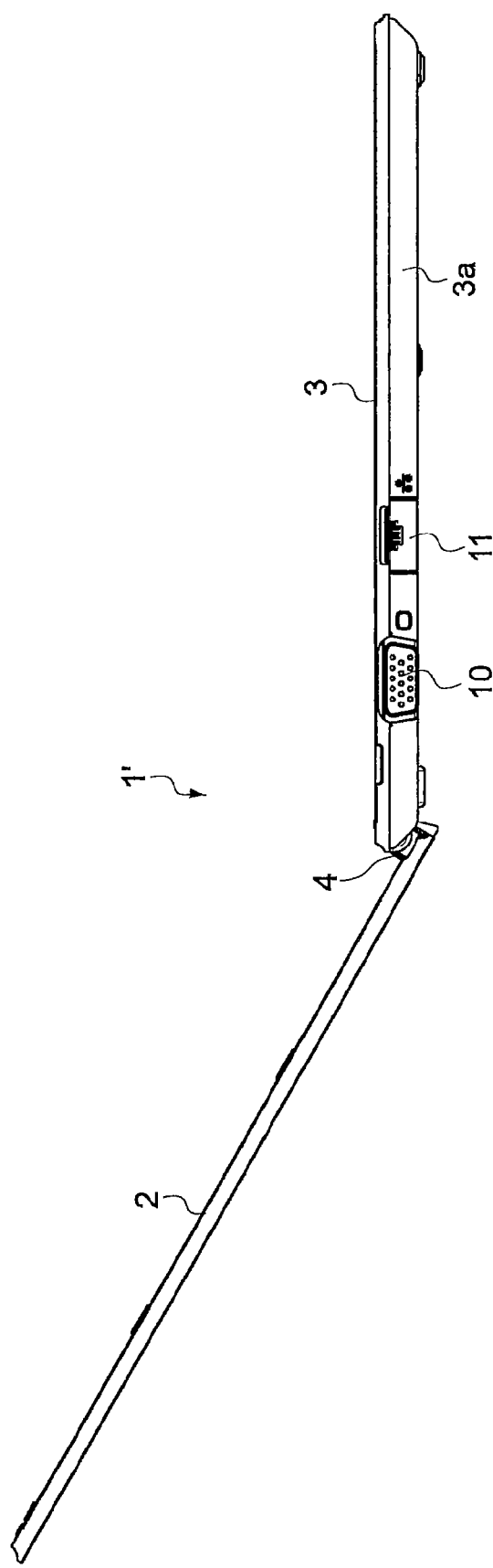
FIG. 19 is a side view showing an electronic apparatus of Modified Example 1.

FIG. 19 is a side view showing an electronic apparatus according to a modified example.

The above embodiment has shown the example in which the VGA connector 10 and the Ethernet connector 11 are provided on the right hand side surface 3b of the main body portion 3. However, the present invention is not limited thereto, and the same effect as the above embodiment can also be obtained when the VGA connector 10 and the Ethernet connector 11 are provided on the left hand side surface 3a of the main body portion 3 as shown in FIG. 19. Moreover, the same effect as the above embodiment can also be obtained when one of the VGA connector 10 and the Ethernet connector 11 is provided on the left hand side surface 3a of the main body portion 3 and the other one of the VGA connector 10 and the Ethernet connector 11 is provided on the right hand side surface 3b of the main body portion 3.

The present invention is not limited to the above embodiment and may be variously modified within the technical idea of the present invention.

The above embodiment has shown the example in which the display portion 2, the bottom tilt foots 20a and 20b, and the cover 11a are independently rotatable. However, it is also possible to cause the bottom tilt foots 20a and 20b and the cover 11a to rotate in an interlocking manner with the rotation of the display portion 2 with respect to the main body portion 3. In other words, the bottom tilt foots 20a and 20b may rotate from the closed state shown in FIG. 8 to the opened state shown in FIG. 9 in an interlocking manner with the rotation of the display portion 2 from the closed state shown in FIG. 2 to the opened state shown in FIG. 1. Moreover, the cover 11a may rotate from the closed state shown in FIG. 6A to the opened state shown in FIG. 6C in an interlocking manner with the rotation of the display portion 2 from the closed state shown in FIG. 2 to the opened state shown in FIG. 1. Accordingly, by merely opening and closing the display portion 2 with respect to the main body portion 3, the bottom tilt foots 20a and 20b and the cover 11a can be opened and closed.

Further, the bottom tilt foots 20a and 20b may be opened and closed in an interlocking manner with the opening and closing of the cover 11a. With this structure, the bottom tilt foots 20a and 20b can be opened by merely opening the cover 11a for connecting an Ethernet cable.

Figure 20:
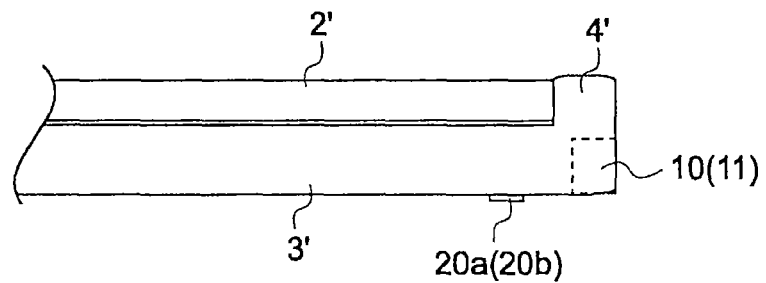
FIG. 20 is a side view showing an electronic apparatus of Modified Example 2.

FIG. 20 is a side view showing an electronic apparatus of Modified Example 2. Even when at least one of the VGA connector 10 and the Ethernet connector 11 is provided on a back surface side of a main body portion 3', the main body portion 3' can be made thin as in the above embodiment or thinner than in the above embodiment, and a stability of the placement condition on the placement surface can be secured.

(Structure of Power Supply Button Portion)

Next, a power supply button portion 70 will be described. The power supply button portion 70 can be pressed by a user and transmits, when it is pressed by the user, a signal notifying to that effect to a controller (EC: Embedded Controller) inside the electronic apparatus 1. Upon receiving the signal from the power supply button portion 70, the controller performs control to supply power from a power supply portion to the respective portions in the electronic apparatus 1 and start up a system in accordance with a program of BIOS (Basic Input/Output System), an operating system, and the like.

Figure 23:
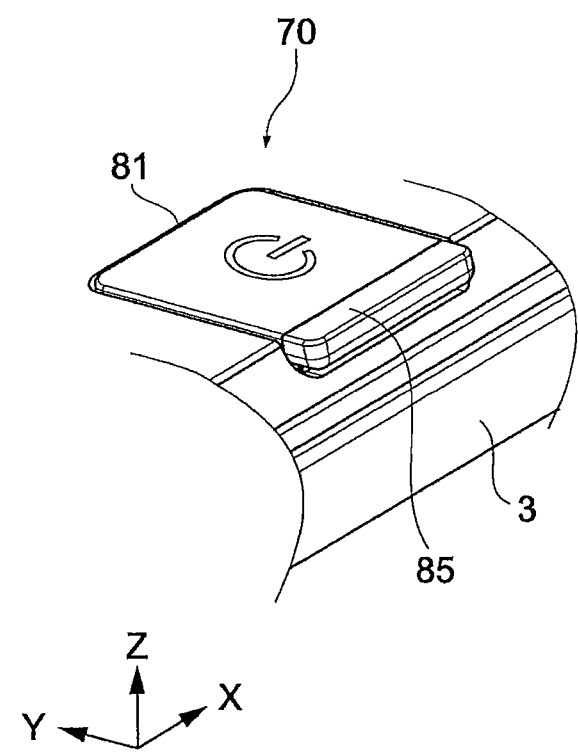
FIG. 23 is a perspective view of a power supply button portion of the electronic apparatus shown in FIG. 1.

The power supply button portion 70 is provided at a right end on the upper surface of the main body portion 3 as shown in FIGS. 1, 22, and 23.

Figure 24:
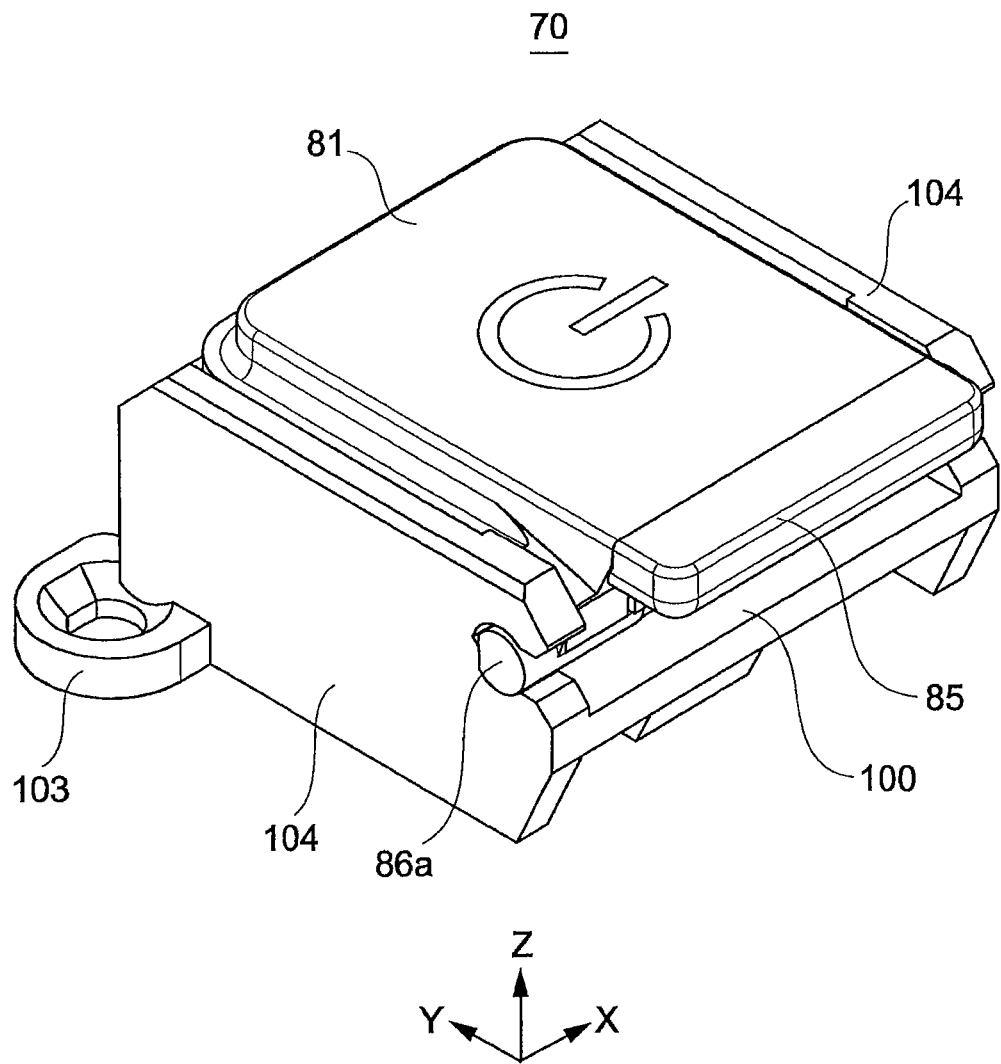
FIG. 24 is a perspective view of the power supply button portion shown in FIG. 23 taken out from a main body portion.
Figure 25:
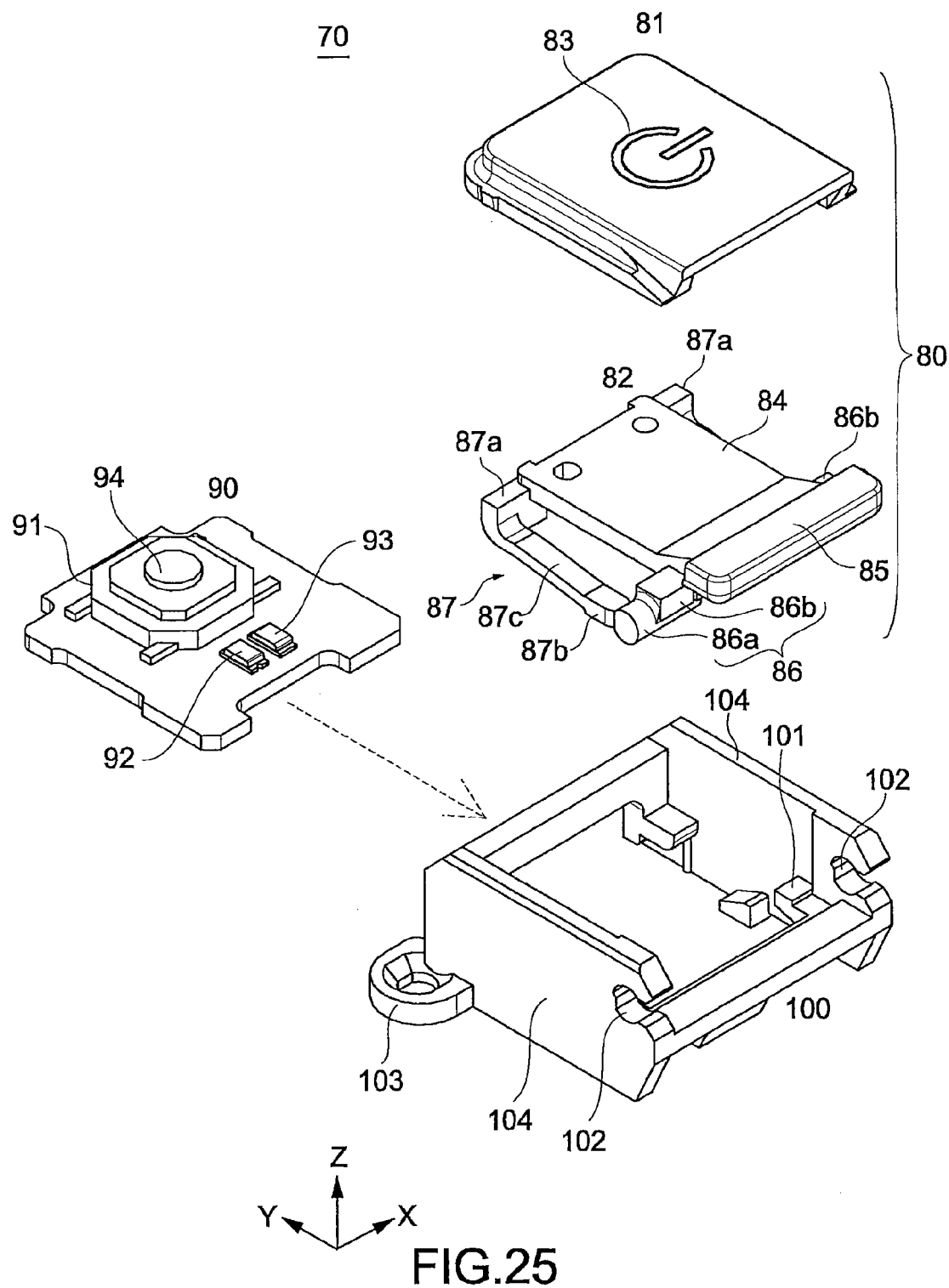
FIG. 25 is an exploded perspective view of the power supply button portion shown in FIG. 24.
Figure 27:
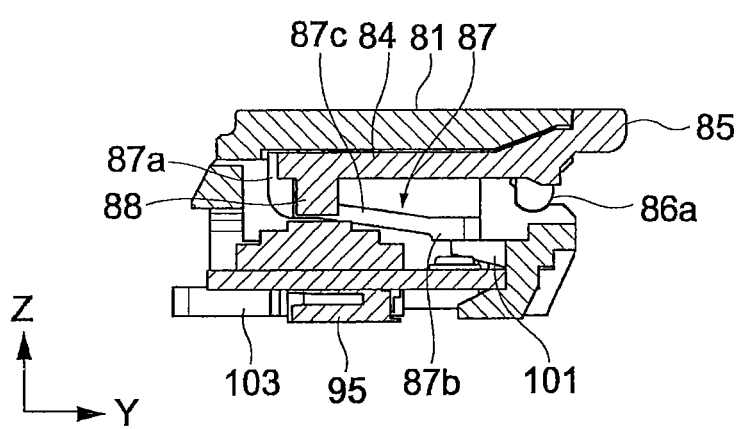
FIG. 27 is a cross-sectional diagram taken along the line A-A of FIG. 26.
Figure 28A:
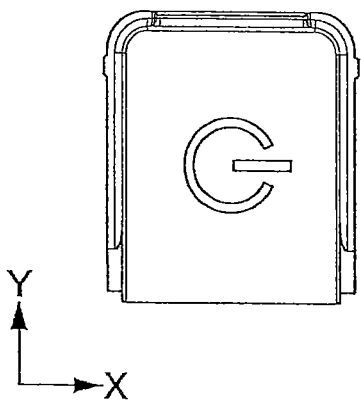
FIGS. 28A-28F show four orthogonal views of a button cover of the power supply button portion shown in FIG. 24.
Figure 28B:
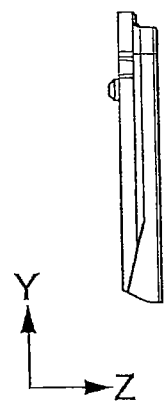
Figure 28C:
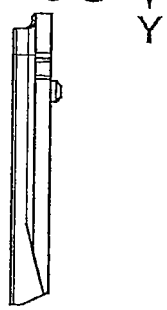
Figure 28D:
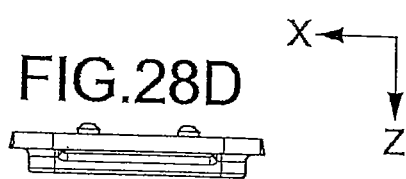
Figure 28E:
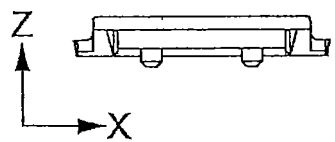
Figure 28F:
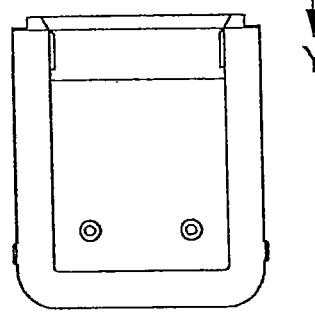
Figure 29A:
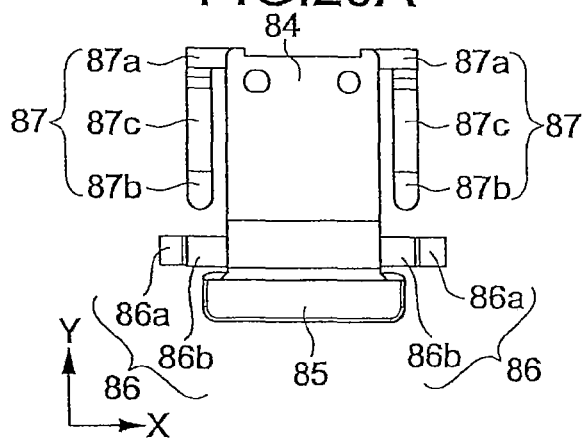
FIGS. 29A-29F show four orthogonal views of a button portion body of the power supply button portion shown in FIG. 24.
Figure 29B:
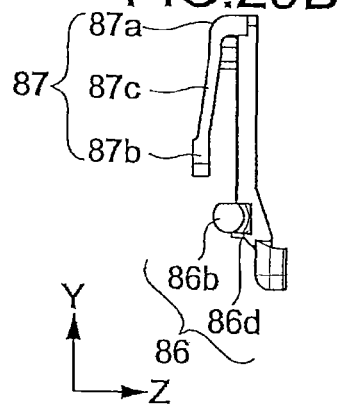
Figure 29C:
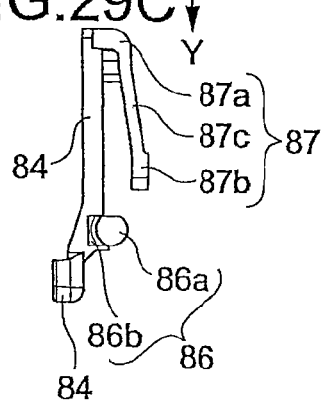
Figure 29D:
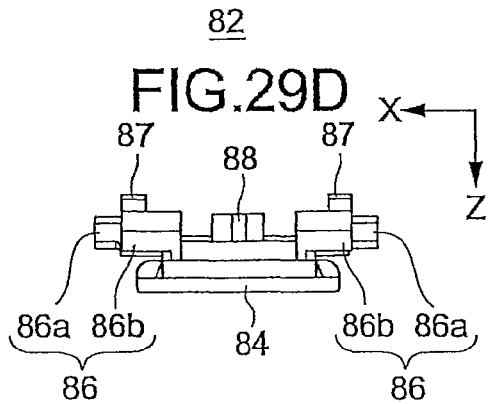
Figure 29E:
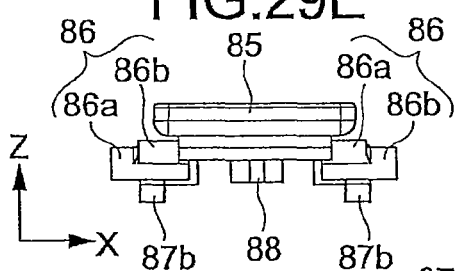
Figure 29F:
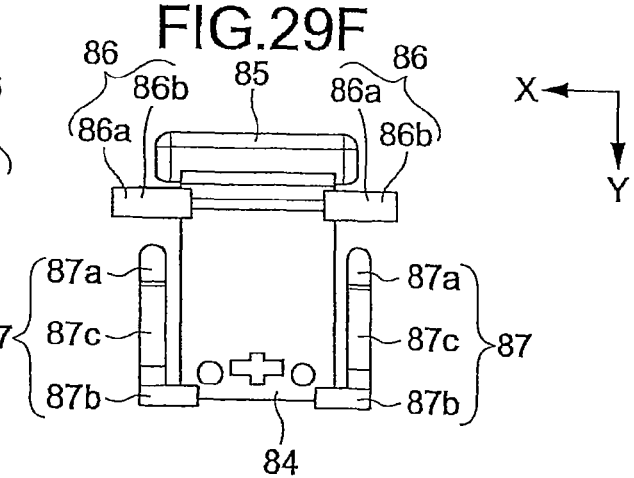
Figure 30A:
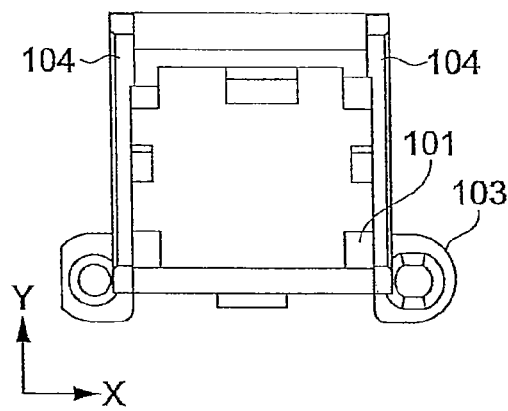
FIGS. 30A-30F show four orthogonal views of a switch casing of the power supply button portion shown in FIG. 24.
Figure 30B:
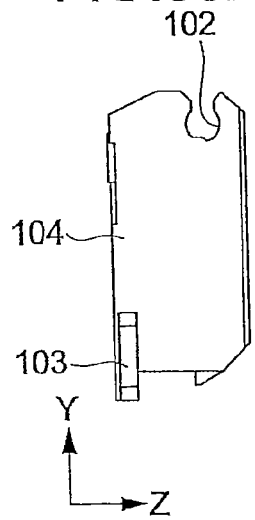
Figure 30C:
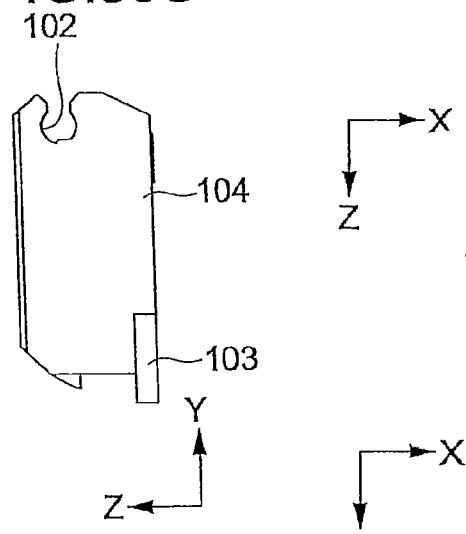
Figure 30D:
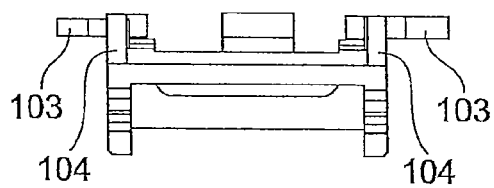
Figure 30E:
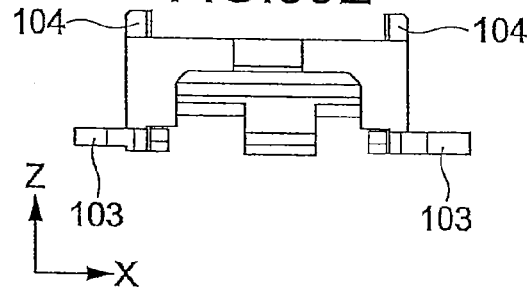
Figure 30F:
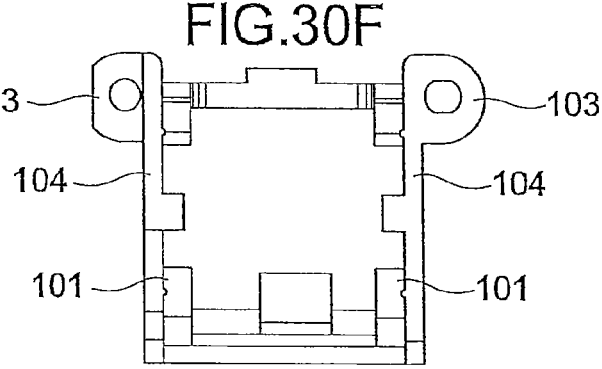
Figure 31A:
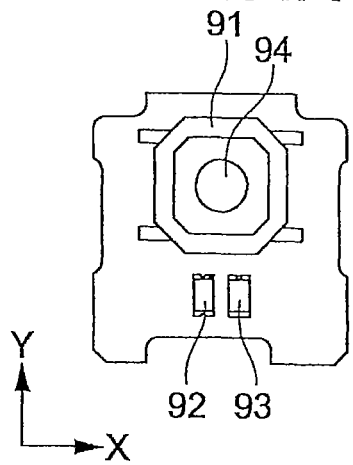
FIGS. 31A-31F show four orthogonal views of a switch substrate of the power supply button portion shown in FIG. 24.
Figure 31B:
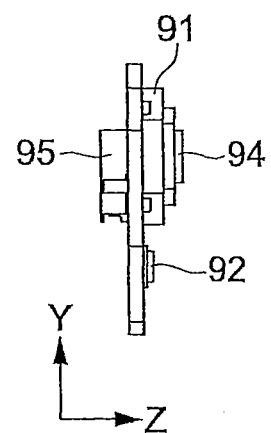
Figure 31C:
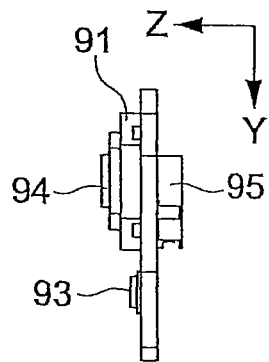
Figure 31D:
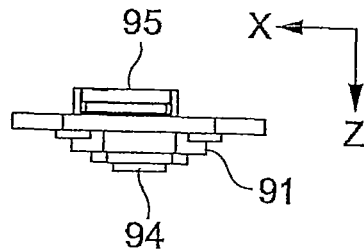
Figure 31E:
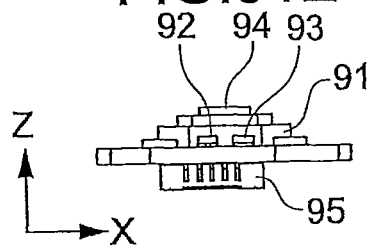
Figure 31F:
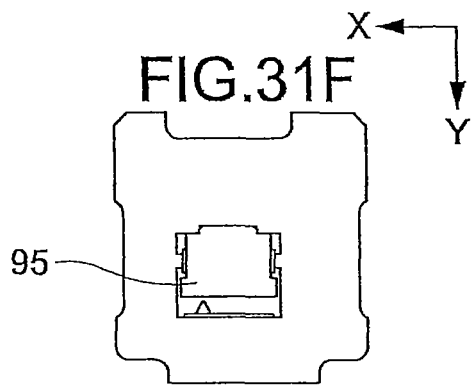

FIG. 24 is a perspective view of the power supply button portion 70 taken out from the main body portion 3. FIG. 25 is an exploded perspective view of the power supply button portion 70. FIG. 26 shows four orthogonal views of the power supply button portion 70. FIG. 27 is a cross sectional diagram taken along the line AA of FIG. 26. As shown in the figures, the power supply button portion 70 includes a button portion 80, a switch substrate 90, and a switch casing 100 that accommodates and supports the button portion 80 and the switch substrate 90.

The button portion 80 is constituted of a button cover 81 and a button portion body 82.

FIG. 28 shows four orthogonal views of the button cover 81. The button cover 81 is fixed to the button portion body 82 by, for example, an adhesive. The button cover 81 is made of a material having the same texture as the palm rest 7, such as a material having high rigidity and quality, the example of which is a magnesium alloy. On a surface of the button cover 81, a mark 83 that enables a power supply switch to be visually recognized by the user at a glance is provided.

FIG. 29 shows four orthogonal views of the button portion body 82. The button portion body 82 includes a cover attachment portion 84, a light guide body exposure portion 85, a pair of coupling portions 86, and a pair of leaf spring portions 87. The button portion body 82 is formed by casting a light guide material. As the light guide material, a milky white resin material that scatters light is used, for example.

The cover attachment portion 84 is a portion to which the button cover 81 is attached. Further, a protrusion 88 is formed on a back surface of the cover attachment portion 84. The protrusion 88 is a portion that comes into contact with a surface of a movable plate 94 of a power supply switch 91 provided on the switch substrate 90 inside the switch casing 100 at a time the button portion 80 is operated by the user and presses it.

The light guide body exposure portion 85 is a plate like portion provided at one end portion of the cover attachment portion 84 in the Y direction (width direction of electronic apparatus). A length of the light guide body exposure portion 85 in the Y direction is, for example, about 1 mm to 3 mm, a width thereof in the X direction (depth direction of electronic apparatus) is, for example, about 5 mm to 10 mm, and a thickness thereof in the Z direction is, for example, about 1 mm to 2 mm. Those dimensions can be changed based on design.

It should be noted that shapes of the button cover 81, the cover attachment portion 84, and the light guide body exposure portion 85 are designed such that an upper surface of the button cover 81 attached to the cover attachment portion 84 and an upper surface of the light guide body exposure portion 85 are positioned on the same plane.

The pair of coupling portions 86 are portions for coupling the switch casing 100 and are provided to be coaxial with a virtual axis provided in the X direction in the vicinity of the light guide body exposure portion 85. The coupling portions 86 are each constituted of a shaft portion 86a and a positioning portion 86b for positioning the shaft portion 86a in the X direction. The shaft portion 86a has a substantially circular cross section and is rotatably held by a shaft holding portion 102 of the button portion body 82. The positioning portion 86b prevents the shaft portion 86a of the button portion body 82 from being detached from the shaft holding portion 102 by restricting a movement of the shaft portion 86a of the button portion body 82 held by the shaft holding portion 102 in the X direction. By the thus structured pair of coupling portions 86, the button portion body 82 is supported while being rotatable about the pair of shaft portions 86a with respect to the switch casing 100. As a result, the button portion body 82 can rotate in a direction that includes a component of the Z direction.

One end portion of each of the pair of leaf spring portions 87 is fixed to an end portion on the other side of an end portion at which the light guide body exposure portion 85 is provided in the button portion body 82, and the other end portion of each of the pair of leaf spring portions 87 is brought into contact with a spring reception portion 101 of the switch casing 100. Specifically, each of the leaf spring portions 87 includes a fixing portion 87a to be fixed with the cover attachment portion 84, a contact portion 87b that comes into contact with the spring reception portion 101 of the switch casing 100, and a leaf spring structure portion 87c interposed between the fixing portion 87a and the contact portion 87b. When the cover attachment portion 84 is caused to rotate about the shaft portions 86a by a pressure applied by a finger of the user, the leaf spring structure portions 87c of the pair of leaf spring portions 87 are elastically deformed, and when the finger of the user is released, the cover attachment portion 84 is caused to rotate in an opposite direction by an elastic force to return to its original position.

FIG. 30 shows four orthogonal views of the switch casing 100. The switch casing 100 is supported on a mother board substrate or the like inside the main body portion 3 of the electronic apparatus 1. A plurality of screwing portions 103 for fixing the switch casing 100 to the main body portion 3 are formed on the switch casing 100. The switch casing 100 is a substantially cubic casing having a space capable of accommodating the button portion 80 and the switch substrate 90. Both sides of the switch casing 100 in the Z direction are opened, and in the switch casing 100, the button portion 80 is provided so as to block one of the openings, and the switch substrate 90 is provided so as to block the other one of the openings. Furthermore, the switch casing 100 includes a pair of side plate portions 104 that face each other in the X direction, and shaft holding portions 102 for respectively holding the shaft portions 86a of the pair of coupling portions 86 are provided on the side plate portions 104. One end of each of the shaft holding portions 102 in the Y direction is opened so that the shaft portion 86a of the coupling portion 86 can be inserted from the opened portion in the Y direction at a time the power supply button portion 70 is assembled.

FIG. 31 shows four orthogonal views of the switch substrate 90. The power supply switch 91, light emitting devices 92 and 93, a driver circuit (not shown) for driving the light emitting devices 92 and 93, and the like are mounted on the switch substrate 90. The switch substrate 90 is electrically connected to the main body portion 3 of the electronic apparatus 1 via wirings (not shown). The power supply switch 91 includes the movable plate 94 that moves vertically by being pressed by the protrusion 88 protruding from the lower surface of the cover attachment portion 84 of the button portion body 82.

The power supply switch 91 electrically detects that the movable plate 94 has been lowered by the press of the protrusion 88 and outputs a detection signal to the controller of the electronic apparatus 1. The light emitting devices 92 and 93 are, for example, light emitting diodes. In the electronic apparatus, light emitting devices 92 and 93 of two colors of, for example, green and red are mounted as the light emitting devices 92 and 93, and the light emitting devices 92 and 93 are driven while being switched based on an operation state of the electronic apparatus 1. For example, drive of the light emitting devices 92 and 93 is controlled based on the operation state of the electronic apparatus 1 as in the case where the green color light emitting device 92 is lit when the power is on, and the red color light emitting device 93 flashes in a power saving standby mode.

Moreover, on a surface of the switch substrate 90 on the other side of the surface on which the power supply switch 91 and the light emitting devices 92 and 93 are mounted, a connector 95 to which one end of a flexible print substrate (not shown) whose other end is connected to the mother board provided inside the main body portion 3 of the electronic apparatus 1 is connected is provided. With this structure, the switch substrate 90 and the mother board provided inside the main body portion 3 are electrically connected. Here, a connector portion of the switch substrate 90 is directed so that it is connected with the flexible print substrate at the left end when seen from the user using the electronic apparatus 1. In other words, the switch substrate 90 is mounted while being directed so that the connector portion is positioned closer to a side surface that is farther away from the switch substrate 90 out of the two side surfaces of the electronic apparatus 1 in the Y direction. With this structure, a drawing amount of the flexible print substrate can be reduced.

Furthermore, in a positional relationship between the power supply switch 91 and the light emitting devices 92 and 93 on the switch substrate 90, the light emitting devices 92 and 93 are positioned closer to the right hand side surface of the electronic apparatus 1, and the power supply switch 91 is provided more on the left hand side than the light emitting devices 92 and 93. In other words, the light emitting devices 92 and 93 are provided at a position closer to the side surface that is closer to themselves than the power supply switch 91 out of the two side surfaces of the electronic apparatus 1 in the Y direction. With this structure, a larger amount of light of the light emitting devices 92 and 93 reaches the light guide body exposure portion 85 protruding from the side surface than in the case where the power supply switch 91 is provided at a position closer to the side surface than the light emitting devices 92 and 93, with the result that the light guide body exposure portion 85 can be lit with more brightness.

(Display of State by Light Guide Body Exposure Portion 85)

Figure 32A:
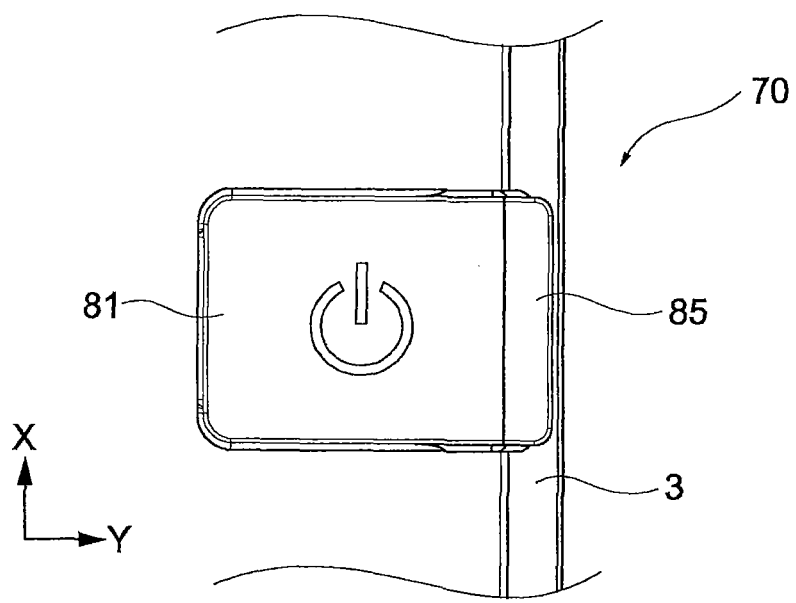
FIG. 32A is a plan view of the power supply button portion in a state where a display portion is closed.
Figure 32B:
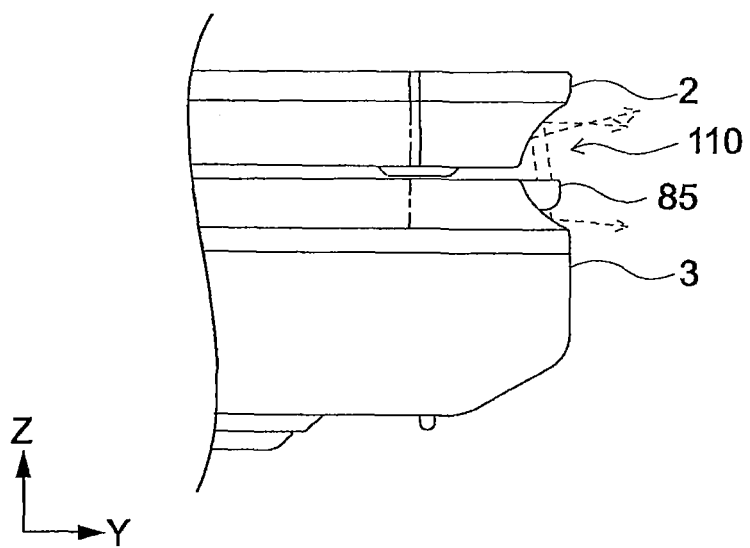
FIG. 32B is a side view thereof.

As described above, the button portion body 82 of the power supply button portion 70 is formed entirely of a light guide material. The button portion body 82 includes the light guide body exposure portion 85. FIG. 32A is a plan view of the power supply button portion 70 in a state where the display portion 2 is closed, and FIG. 32B is a side view thereof. As shown in the figures, the light guide body exposure portion 85 of the button portion body 82 protrudes from the side surface of the main body portion 3. Here, the side surface of the main body portion 3 is bulged such that an apex is formed substantially at an intermediate height. A tip end of the light guide body exposure portion 85 reaches the apex of the bulged side surface of the main body portion 3 or a position in the vicinity of the apex. On the other hand, the side surface of the display portion 2 is also similarly bulged such that an apex is formed substantially at an intermediate height. Therefore, when the display portion 2 is closed and folded with respect to the main body portion 3, a U shaped groove 110 is formed in adjacent side surface areas of the display portion 2 and the main body portion 3. The light guide body exposure portion 85 of the button portion body 82 is exposed from the U shaped groove 110.

In the power supply button portion 70, the light emitting devices 92 and 93 are provided inside the switch casing 100, and the button portion body 82 formed of a light guide material is provided above the light emitting devices 92 and 93. Therefore, light that has entered the button portion body 82 out of light emitted from the light emitting devices 92 and 93 is diffused inside the button portion body 82, with the result that the button portion body 82 is lit in a color corresponding to the light emitting device being driven. Light emission by the button portion body 82 can be visually recognized by the user from outside mainly via the light guide body exposure portion 85. Accordingly, the user can grasp the state of the electronic apparatus 1. Moreover, by providing the light guide body exposure portion 85 of the button portion body 82 in the U shaped groove 110 formed on the adjacent side surfaces of the display portion 2 and the main body portion 3, light of the light guide body exposure portion 85 is diffusely reflected by a surface inside the U shaped groove 110 to thus make the light emission state more conspicuous.

Further, as described above, in the power supply button portion 70, even when the display portion 2 is closed and folded with respect to the main body portion 3, the user can grasp the state of the electronic apparatus 1 based on the light emissions state of the light guide body exposure portion 85 protruding from the side surface of the electronic apparatus 1. As a result, an electronic apparatus in which the power supply button portion 70 having the function of displaying a state of the electronic apparatus 1 is provided so as to be exposed from the upper surface of the main body portion 3 can be realized, and the entire apparatus can therefore be made thinner.

(Improvement of Diffuseness of Button Portion Body 82)

Figure 33:
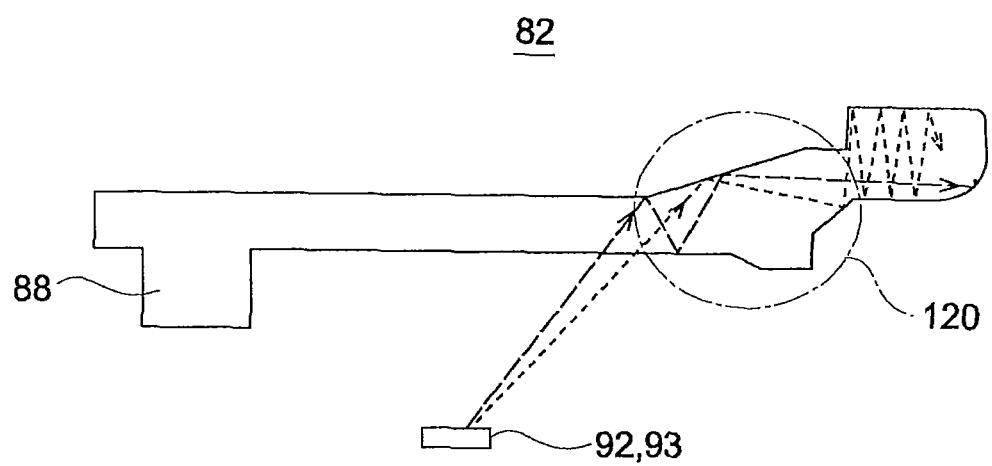
FIG. 33 is an enlarged diagram of the button portion body.

FIG. 33 is an enlarged diagram of the button portion body 82.

Figure 34:
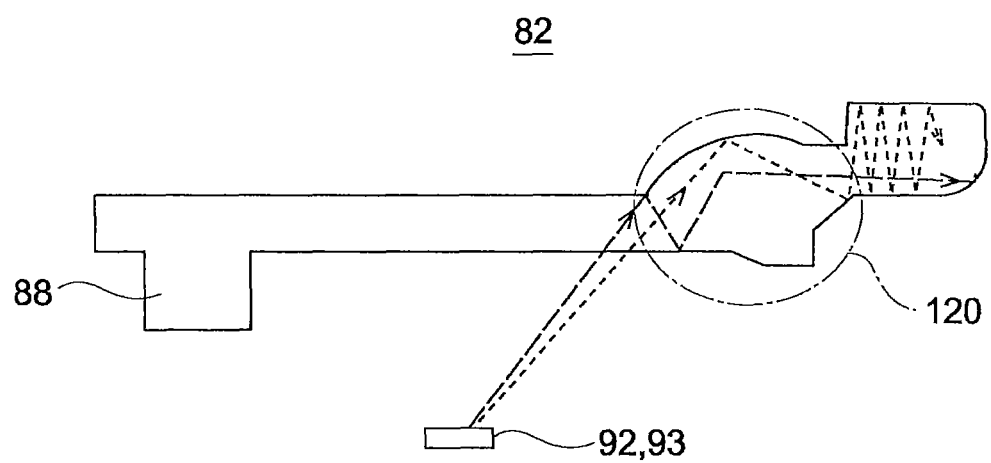
FIG. 34 is an enlarged diagram of a button portion body according to a modified example.

The button portion body 82 receives light from the light emitting devices 92 and 93 on the lower surface of the substantially plate like cover attachment portion 84 and scatters the light in various directions. However, the light is eventually concentrated at the end of the button portion body 82 to lose uniformity in lighting the entire button portion body 82. In this regard, as shown in FIG. 33, a diffuse reflection portion 120 such as a convex portion and a tilted portion is provided between the cover attachment portion 84 and the light guide body exposure portion 85 on the button portion body 82 for causing a diffusion by diffusely reflecting light. By the diffusion caused by the diffuse reflection of light by the diffuse reflection portion 120, light can be guided to the entire light guide body exposure portion 85 more uniformly, and the entire light guide body exposure portion 85 can thus be lit uniformly. FIG. 34 is an enlarged diagram of the button portion body 82 according to a modified example. The diffuse reflection portion 120 can be structured using a curved portion.

Furthermore, since the leaf spring portions 87 are integrally formed on the button portion body 82 as means for generating a desired repulsion with respect to the press by the user in the power supply button portion 70, no elastic component needs to be additionally incorporated. Therefore, a size and cost as well as the number of components can be reduced.

The above descriptions have been given on the power supply button. However, the present invention is also applicable to buttons other than the power supply button.

It should be understood by those skilled in the art that various modifications, combinations, sub combinations and alterations may occur depending on design requirements and other factors insofar as they are within the scope of the appended claims or the equivalents thereof.

What is claimed is:

1. An electronic apparatus, comprising:
a display portion including a display screen;
a main body portion including an upper surface and a bottom surface facing each other; and
a coupling portion to couple the display portion with the main body portion such that the display portion becomes rotatable between a first state where the display screen faces the upper surface and a second state where the display screen forms a predetermined angle with respect to the upper surface, the main body portion including
a pair of side surfaces that connect the upper surface and the bottom surface and face each other, and
a first connector that is provided on one of the pair of side surfaces while being connectable with a first external connector,
the display portion including
a first leg portion that protrudes to be positioned lower than the entire bottom surface in the second state and comes into contact with a surface on which the main body portion is placed to form a predetermined tilt of the bottom surface with respect to the surface, wherein a corner of the first leg portion principally supports a back portion of the main body of the electronic apparatus in the second state.

2. The electronic apparatus according to claim 1, wherein the pair of side surfaces are substantially orthogonal to upper surface or the bottom surface.

3. The electronic apparatus according to claim 1, wherein the main body portion has a dented portion that is provided in the vicinity of the coupling portion and capable of accommodating a second leg portion at a first rotational position formed on the bottom surface thereof.

4. The electronic apparatus according to claim 1, wherein the first connector is a connector for supplying a video signal to an external display.

5. The electronic apparatus according to claim 1, wherein the main body portion further includes a second connector provided more on a front side than the first connector, and wherein a size of the second connector in the thickness direction of the main body portion is smaller than that of the first connector.

6. The electronic apparatus according to claim 5, wherein the second connector is provided on at least one of the pair of side surfaces.

7. The electronic apparatus according to claim 1, wherein the apparatus further comprising
a second connector that is provided on one of the pair of side surfaces while being connectable with a second external connector and a cover that is retractable in a direction towards the bottom surface.

8. The electronic apparatus according to claim 7, wherein the second connector includes a terminal portion provided on the side surface, and the cover has an L-shaped cross section for covering a lower surface of the second connector and the terminal portion of the second connector.

9. The electronic apparatus according to claim 8, wherein a position of a lower surface of the cover and a position of the bottom surface in a thickness direction to the bottom surface are substantially the same.

10. The electronic apparatus according to claim 1, wherein at least a part of the first leg portion is positioned at a lower end of the display portion.

11. The electronic apparatus according to claim 1, wherein the main body portion further includes a second leg portion, the second leg portion being positioned above the first leg portion in a first rotational position, and being positioned lower than the first leg portion in a second rotational position.

* * * * *